(12) United States Patent
Takada

(10) Patent No.: US 10,191,260 B2
(45) Date of Patent: Jan. 29, 2019

(54) ZOOM IMAGE PICKUP APPARATUS

(71) Applicant: OLYMPUS CORPORATION, Hachioji-shi, Tokyo (JP)

(72) Inventor: Keisuke Takada, Kokubunji (JP)

(73) Assignee: OLYMPUS CORPORATION, Tokyo (JP)

(*) Notice: Subject to any disclaimer, the term of this patent is extended or adjusted under 35 U.S.C. 154(b) by 5 days.

(21) Appl. No.: 15/674,437

(22) Filed: Aug. 10, 2017

(65) Prior Publication Data

US 2017/0363846 A1 Dec. 21, 2017

Related U.S. Application Data

(63) Continuation of application No. PCT/JP2015/053641, filed on Feb. 10, 2015.

(51) Int. Cl.
*G02B 13/18* (2006.01)
*G02B 15/20* (2006.01)
(Continued)

(52) U.S. Cl.
CPC ........... *G02B 15/20* (2013.01); *G02B 15/167* (2013.01); *G02B 15/173* (2013.01);
(Continued)

(58) Field of Classification Search
CPC .. G02B 13/0045; G02B 9/60; G02B 27/0025; G02B 13/18; G02B 15/20; G02B 13/009; G02B 13/002
(Continued)

(56) References Cited

U.S. PATENT DOCUMENTS

| 5,371,566 A | 12/1994 | Asakura |
| 5,808,813 A | 9/1998 | Lucey et al. |

(Continued)

FOREIGN PATENT DOCUMENTS

| JP | 05257054 A | 10/1993 |
| JP | 09325273 A | 12/1997 |

(Continued)

OTHER PUBLICATIONS

International Preliminary Report on Patentability (IPRP) (and English translation thereof) dated Aug. 24, 2017 issued in counterpart International Application No. PCT/JP2015/053641.

(Continued)

*Primary Examiner* — Evelyn A Lester
(74) *Attorney, Agent, or Firm* — Holtz, Holtz & Volek PC

(57) ABSTRACT

A zoom image pickup apparatus includes a mount portion, a zoom lens which forms an image of light incident from the mount portion, and an image pickup element which is disposed at an image forming position, wherein the zoom lens includes in order from an object side, a first lens unit having a positive refractive power, a second lens unit having a negative refractive power, a third lens unit having a positive refractive power, a fourth lens unit having a negative refractive power, and a fifth lens unit having a positive refractive power, and the fourth lens unit is a focusing lens unit, and at the time of zooming from a wide angle end to a telephoto end, only the second lens unit and the fourth lens unit move, and the following conditional expression (1) is satisfied:

$$\phi_{L1} < \phi_{3GL1} \qquad (1).$$

16 Claims, 20 Drawing Sheets

(51) Int. Cl.
    *G02B 15/167*     (2006.01)
    *G02B 23/24*     (2006.01)
    *G02B 15/173*     (2006.01)
    *G02B 9/60*     (2006.01)
    *G02B 13/00*     (2006.01)
    *G02B 27/00*     (2006.01)

(52) U.S. Cl.
    CPC ............ *G02B 23/2438* (2013.01); *G02B 9/60* (2013.01); *G02B 13/002* (2013.01); *G02B 13/009* (2013.01); *G02B 13/0045* (2013.01); *G02B 13/18* (2013.01); *G02B 27/0025* (2013.01)

(58) Field of Classification Search
    USPC .................. 359/683–686, 698, 714, 764, 766
    See application file for complete search history.

(56) References Cited

U.S. PATENT DOCUMENTS

| | | |
|---|---|---|
| 5,933,282 A | 8/1999 | Tomioka et al. |
| 7,714,885 B2 | 5/2010 | Yazawa et al. |
| 8,339,714 B2 | 12/2012 | Tochigi et al. |
| 8,582,212 B2 | 11/2013 | Ogata et al. |
| 8,767,310 B2 | 7/2014 | Ogata et al. |
| 2013/0286276 A1* | 10/2013 | Kawamura ............ G02B 15/14 348/345 |
| 2015/0346466 A1* | 12/2015 | Ichikawa ............. G02B 15/173 359/683 |
| 2017/0336593 A1* | 11/2017 | Takada .................. G02B 15/16 |

FOREIGN PATENT DOCUMENTS

| | | |
|---|---|---|
| JP | 11125770 A | 5/1999 |
| JP | 2001503159 A | 3/2001 |
| JP | 2002136477 A | 5/2002 |
| JP | 2005352183 A | 12/2005 |
| JP | 2006215257 A | 8/2006 |
| JP | 2010197860 A | 9/2010 |
| JP | 2012027262 A | 2/2012 |
| JP | 2012083601 A | 4/2012 |

OTHER PUBLICATIONS

International Search Report (ISR) and Written Opinion dated May 19, 2015 issued in International Application No. PCT/JP2015/053641.

* cited by examiner

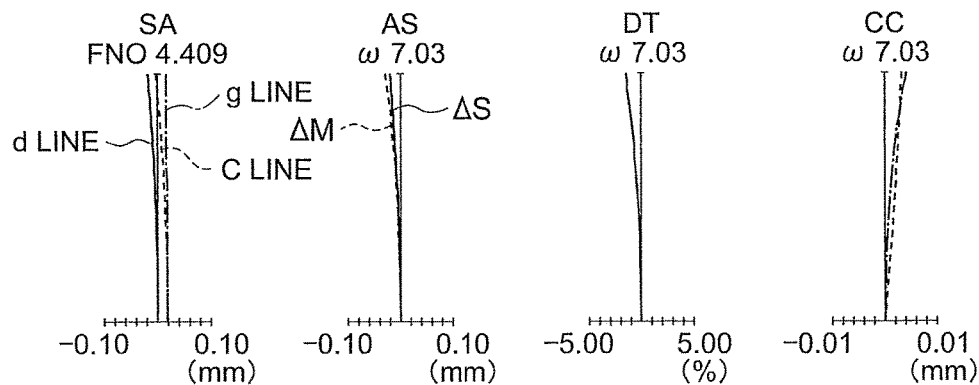
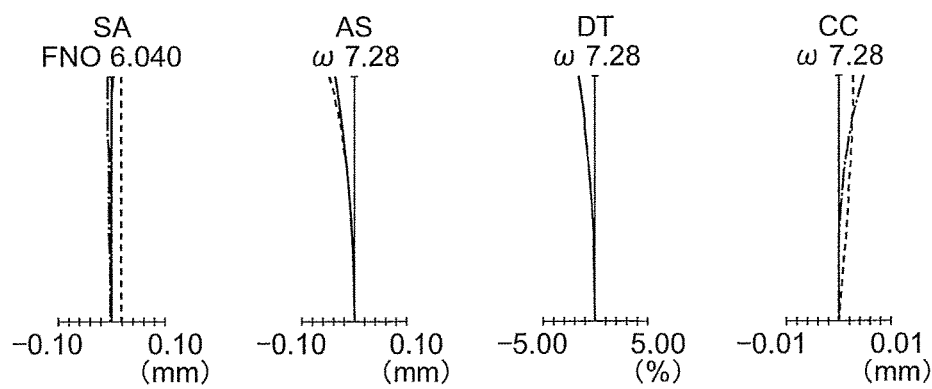
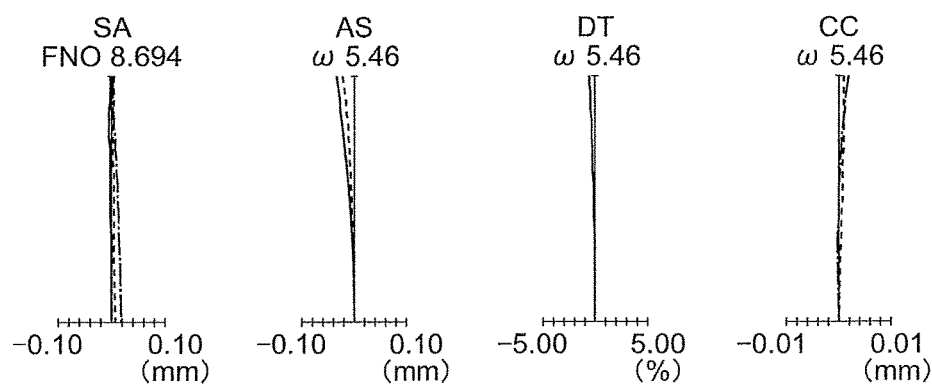

SA
FNO 2.491
-0.10  0.10
(mm)

AS
ω 6.83
-0.10  0.10
(mm)

DT
ω 6.83
-5.00  5.00
(%)

CC
ω 6.83
-0.01  0.01
(mm)

SA
FNO 3.362
-0.10  0.10
(mm)

AS
ω 7.17
-0.10  0.10
(mm)

DT
ω 7.17
-5.00  5.00
(%)

CC
ω 7.17
-0.01  0.01
(mm)

SA
FNO 4.911
-0.10  0.10
(mm)

AS
ω 5.25
-0.10  0.10
(mm)

DT
ω 5.25
-5.00  5.00
(%)

CC
ω 5.25
-0.01  0.01
(mm)

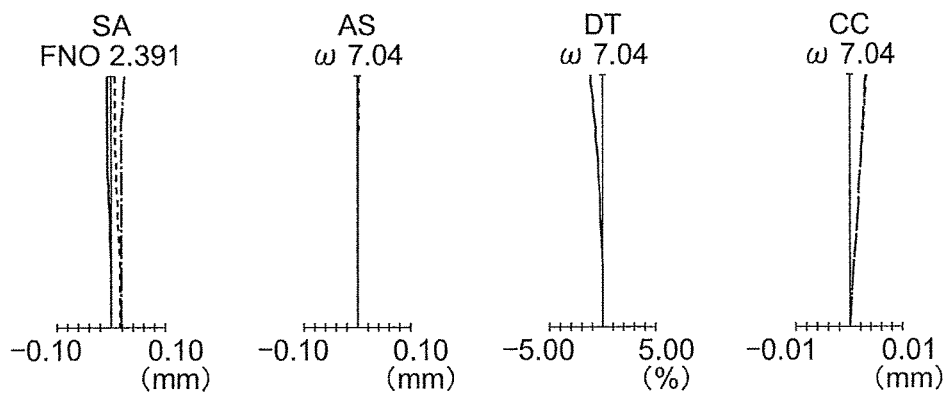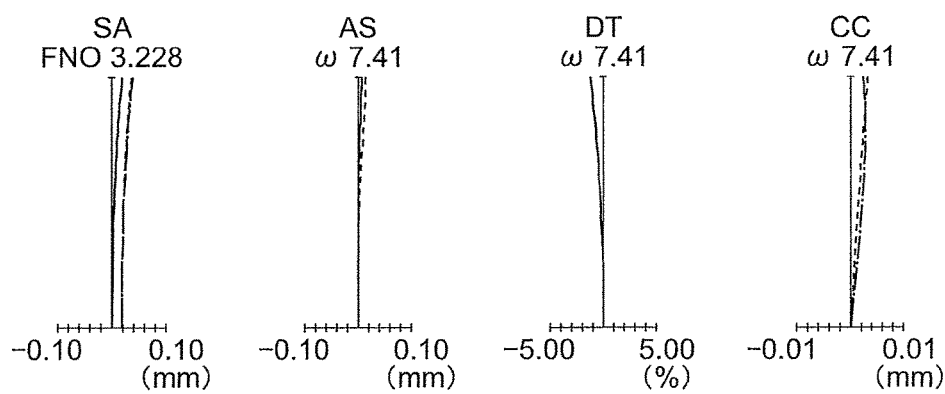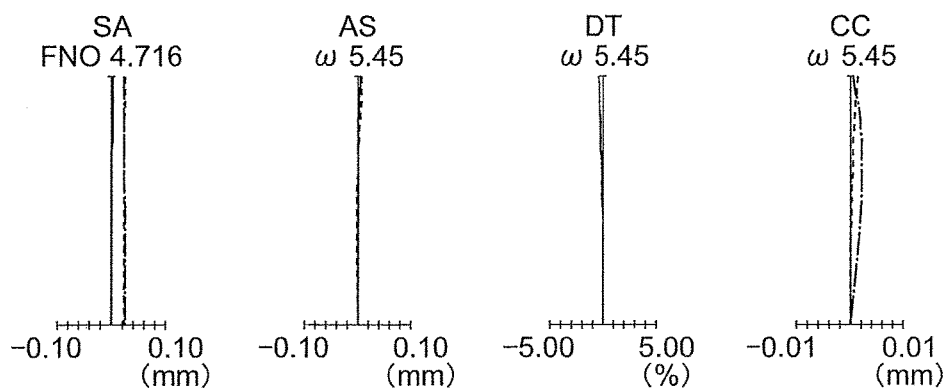

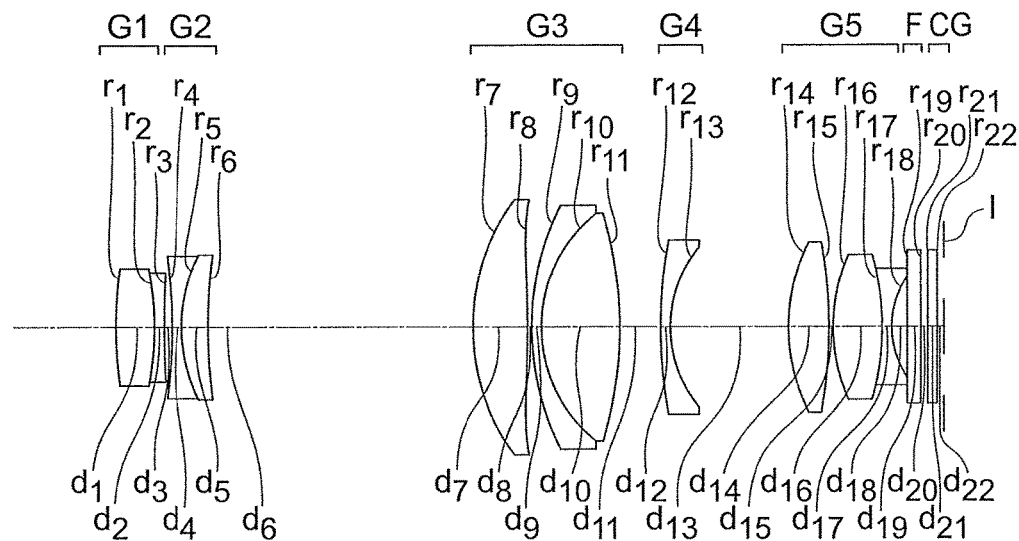
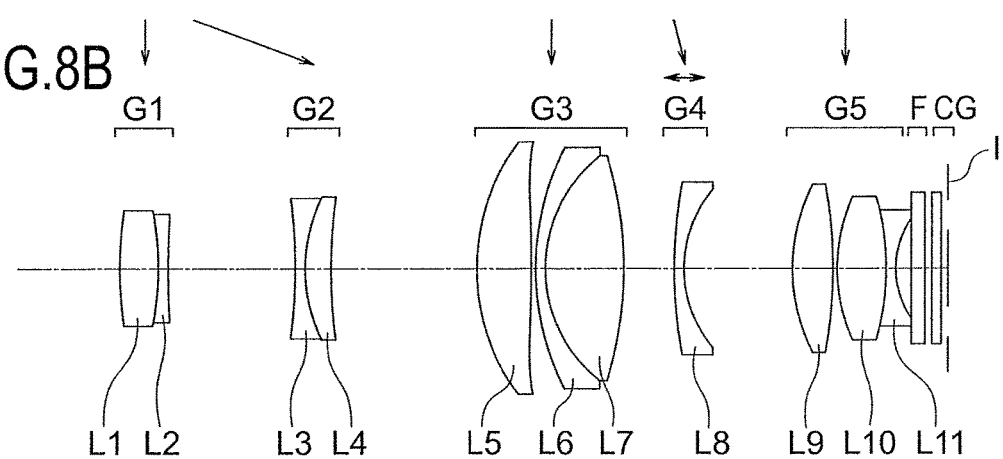
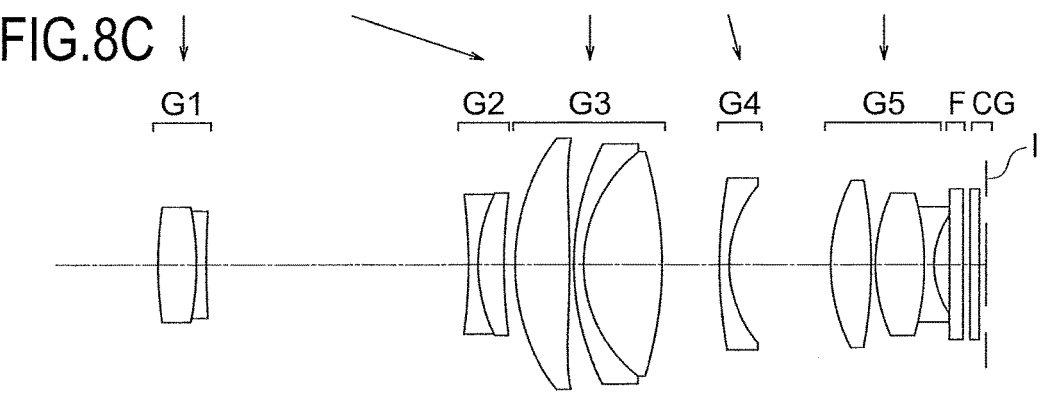

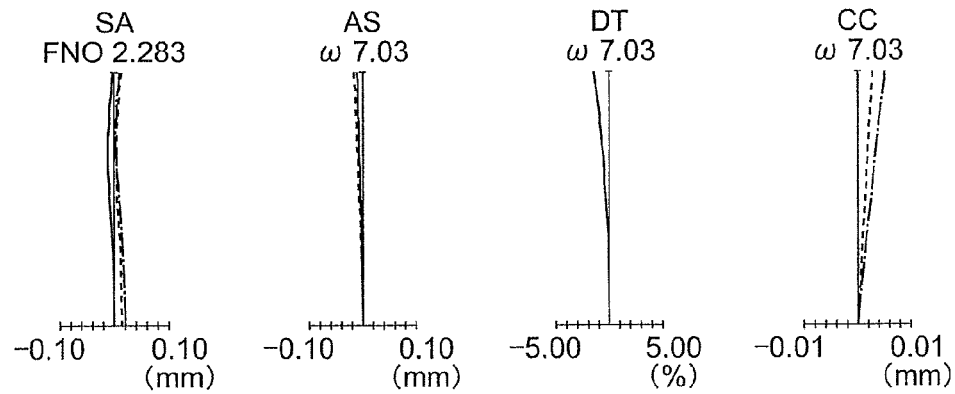
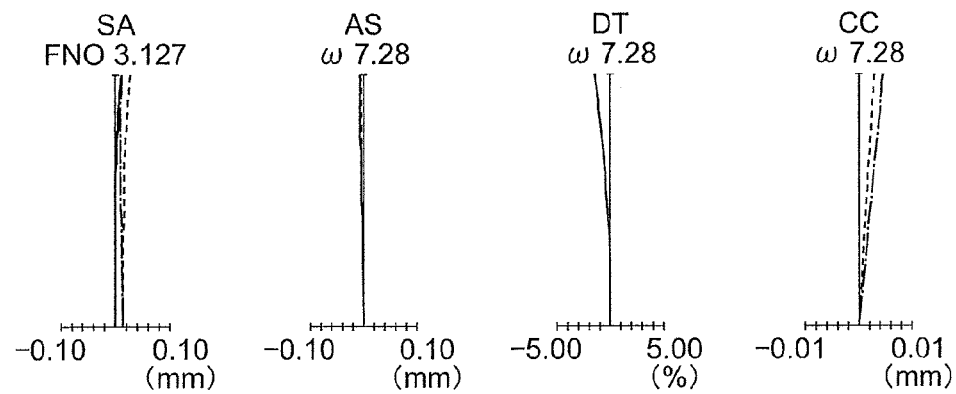
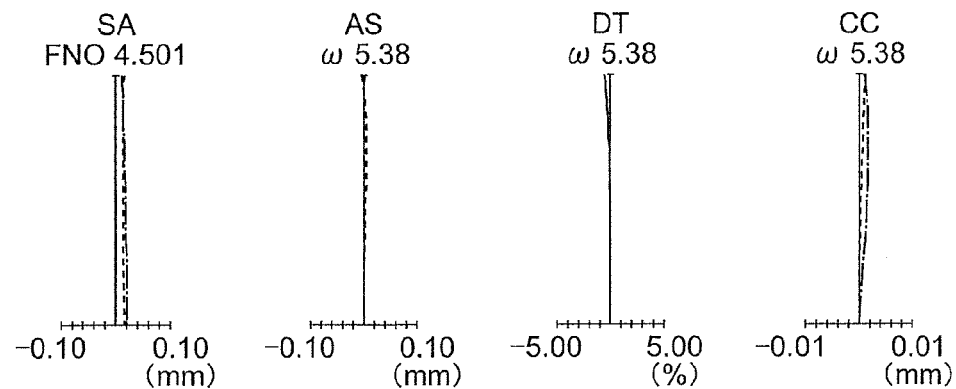

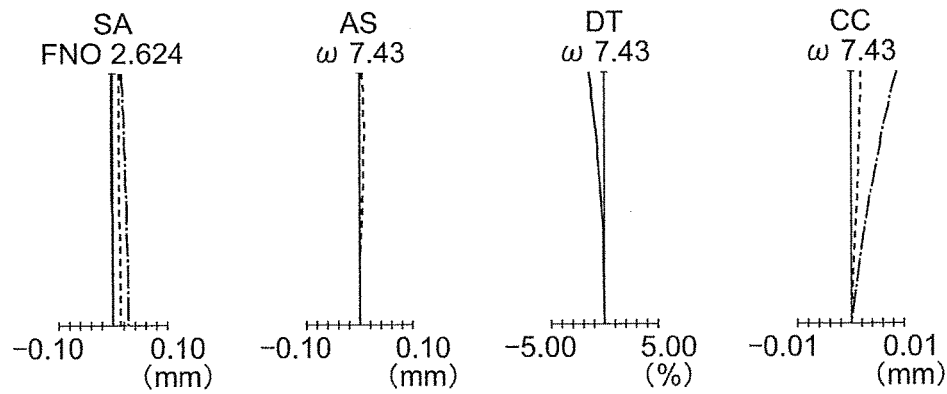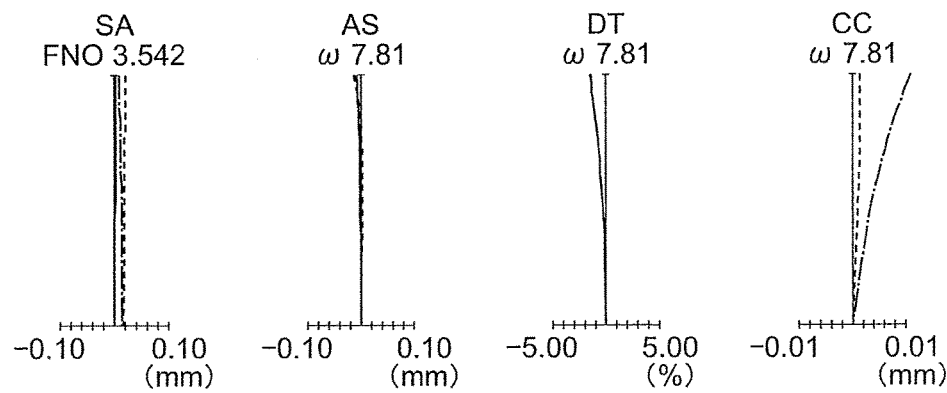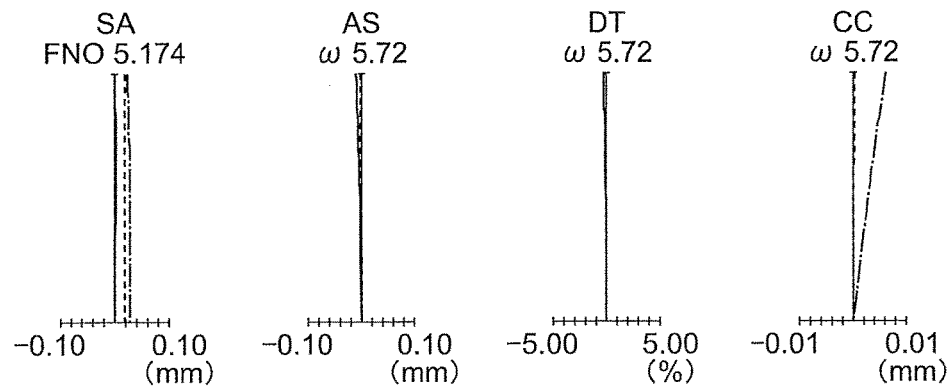

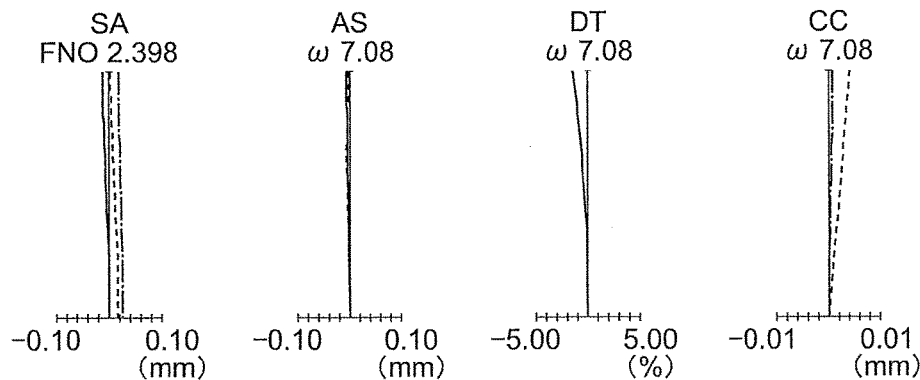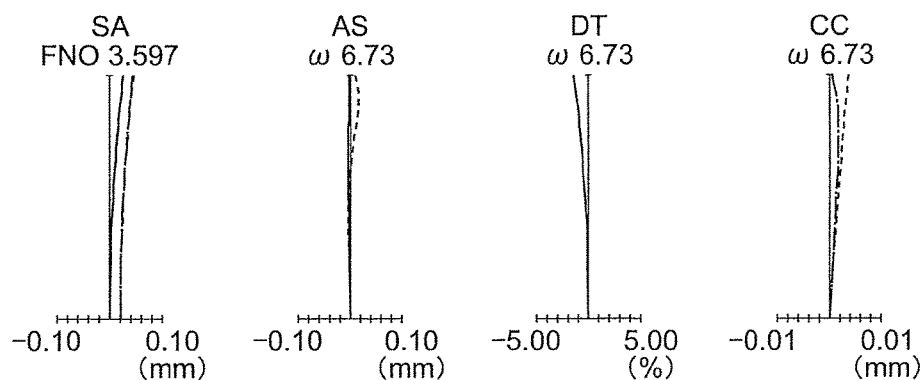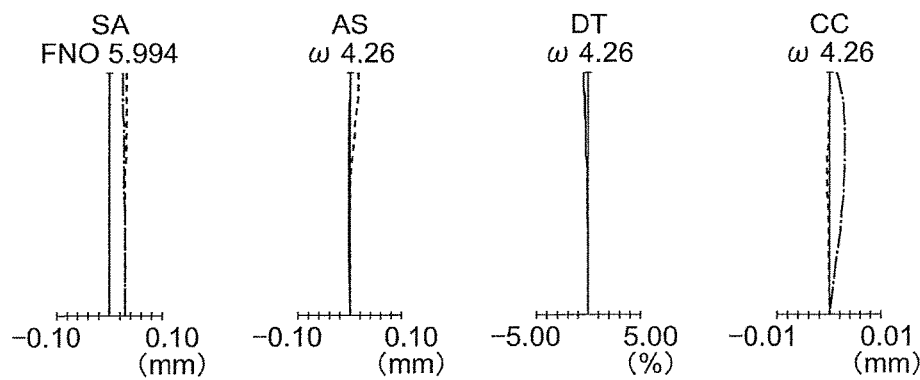

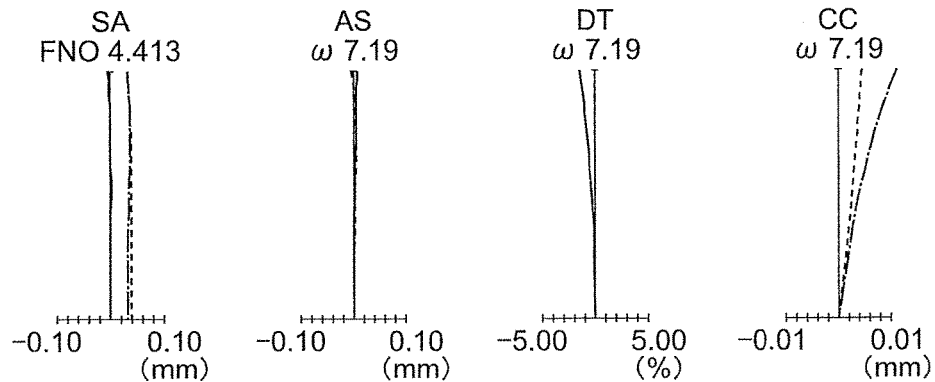
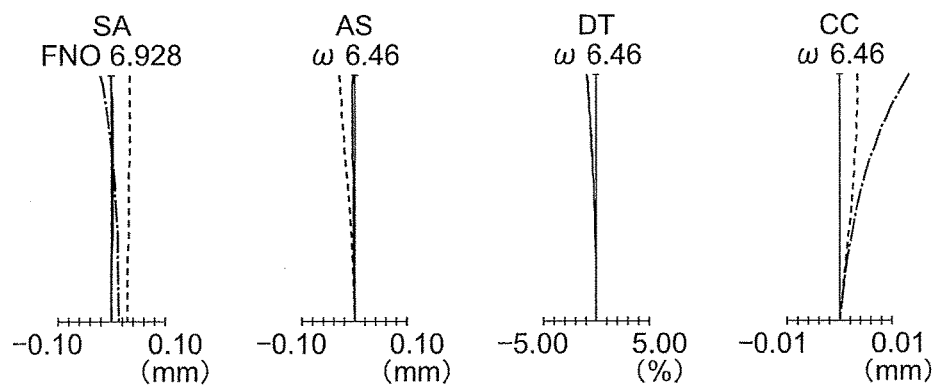
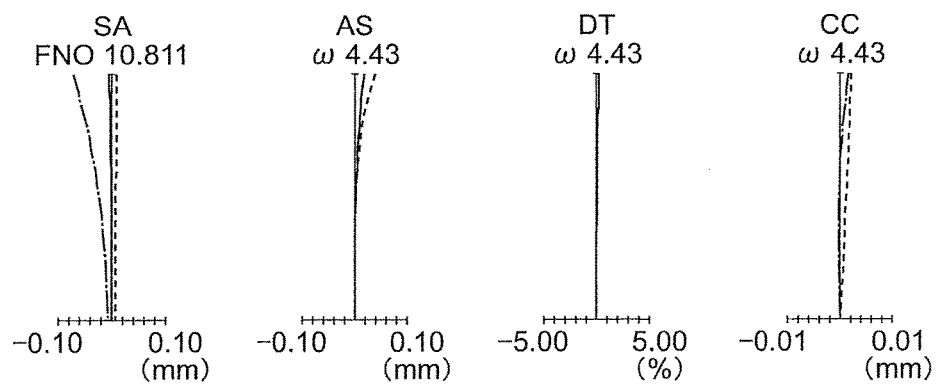

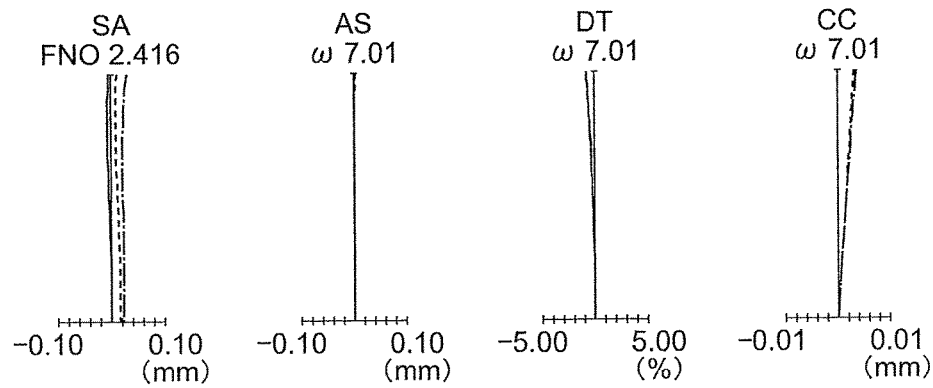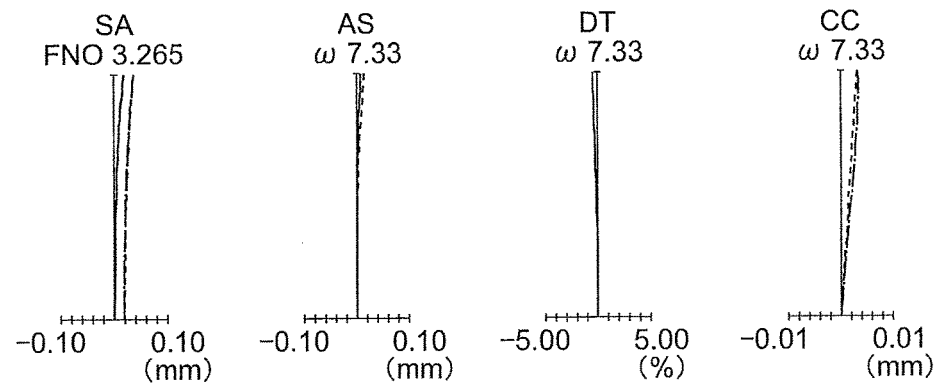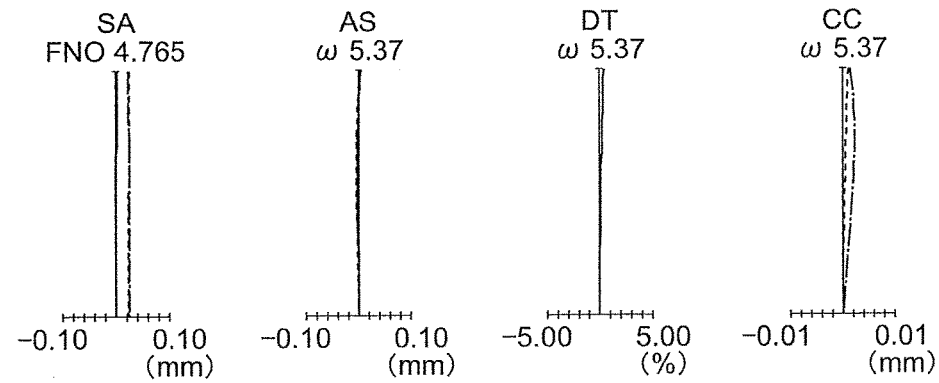

ZOOM IMAGE PICKUP APPARATUS

CROSS-REFERENCE TO RELATED APPLICATION

The present application is a continuation application of International Application No. PCT/JP2015/053641 filed on Feb. 10, 2015, which claims priority to International Application No. PCT/JP2015/053641; the entire contents of which are incorporated herein by reference.

BACKGROUND OF THE INVENTION

Field of the Invention

The present invention relates to a zoom image pickup apparatus which can be connected to an eyepiece portion of an optical instrument.

Description of the Related Art

Optical instruments include endoscopes, microscopes, telescopes, and binoculars for example. In an endoscope for instance, often, images of a site to be observed are acquired by attaching an adapter and a video camera to an eyepiece portion of the endoscope. Images acquired are used for diagnosis and treatment of the site to be observed. Moreover, images acquired are recorded in a recording medium.

A camera such as a television camera and a film camera is used for imaging. Recently in particular, the imaging is carried out by a small-size television camera in which a solid image pickup element such as a CCD (charge coupled device) is used. An endoscope image that is picked up is displayed on a television monitor for example. In many cases, diagnosis and treatment are carried out by using the endoscope image displayed.

With the recent advancement in semiconductor technology, small-sizing of elements and high-densification of pixels have been carried out for image pickup elements to be used in these television cameras. Therefore, an optical system to be used in combination with such image pickup element also has to have a high optical performance.

As mentioned above, in an endoscope, an adapter and a television camera are to be attached to an eyepiece portion of the endoscope. In such arrangement, an image formed by an eyepiece of the endoscope is formed on an image pickup element provided inside the television camera, via an image pickup optical system in the adapter.

In actual image pickup, different adapters of various types with different magnification are provided, and the adapters are to be used properly according to the type and purpose of the endoscope to be used. For this, a large number of adapters are necessary and the cost becomes high.

Moreover, when a size of a site to be observed is to be changed by changing the magnification while in use, the adapter is to be replaced every time. However, it is difficult to replace the adapter during surgery for example. Moreover, it is practically difficult to adjust a size of an image of a site to be observed to a size desired by a user (such as a person performing the surgery). Consequently, with regard to the size of the image, the user has to compromise to certain extent.

As a method for achieving an image of a size desired by the user, a method of using a zooming optical system for the optical system inside the adapter is available. In a plurality of endoscopes, when each endoscope has same diopter scale, an object-point position with respect to the adapter is same for any endoscope. Consequently, even when the optical system inside the adapter is a zooming optical system, there is no need to provide a focusing mechanism.

However, obviously there are cases in which the diopter scale of each endoscope differs. For example, in rigid endoscopes, diopter scale differs in each rigid endoscope in many cases. Even in flexible endoscopes, obviously there are cases in which the diopter scale of each flexible endoscope differs.

When the diopter scale differs for each endoscope, the diopter scale varies according to an object position. Therefore, when the endoscope to be combined with a zooming optical system differs, in a case in which the diopter scale thereof differs according to a distance up to a site to be observed, it is necessary to provide a focusing mechanism to the zooming optical system.

Although the abovementioned description has been made by citing an example of endoscopes, a point of differing diopter scales is similar for microscope, telescopes, and binoculars.

As a focusing method, there is a method of moving the whole zooming optical system in an optical direction. In video photography, capturing is carried out while zooming and focusing all the time. When the zooming and focusing are carried out all the time, a focusing speed depends on a weight of lenses. Moreover, as an overall length of lenses varies at the time of focusing, the optical system and an overall image pickup apparatus become large.

In view of the abovementioned circumstances, a zooming optical system in which the focusing speed is increased by moving a comparatively small lens and the overall optical system is made compact has been proposed. Such zooming optical systems have been proposed in Japanese Patent Application Laid-open Publication No. Hei 9-325273 and Japanese Patent Application Laid-open Publication No. Hei 11-125770 respectively.

The zooming optical system disclosed in Japanese Patent Application Laid-open Publication No. Hei 9-325273 includes in order from an object side, a first unit having a positive refractive power, a second unit having a negative refractive power, and a third unit having a positive refractive power. The first unit is a focusing lens unit, and a diopter scale adjustment from a positive refractive power to a negative refractive power is possible by the movement of the focusing lens unit.

The zooming optical system disclosed in Japanese Patent Application Laid-open Publication No. Hei 11-125770 includes in order from an object side, a first lens unit having a positive refractive power, a second lens unit having a negative refractive power, a third lens unit having a positive refractive power, and a fourth lens unit. The first lens unit is a focusing lens unit, and the whole lens unit or some of the lenses in the lens unit move in an optical axial direction.

SUMMARY OF THE INVENTION

A zoom image pickup apparatus according to the present invention comprises,
a mount portion,
a zoom lens which forms an image of light incident from the mount portion, and
an image pickup element which is disposed at an image forming position, wherein
the zoom lens includes in order from an object side,
a first lens unit having a positive refractive power,
a second lens unit having a negative refractive power,
a third lens unit having a positive refractive power, a fourth lens unit having a negative refractive power, and
a fifth lens unit having a positive refractive power, and
the fourth lens unit is a focusing lens unit, and
at a time of zooming from a wide angle end to a telephoto end, at least the second lens unit and the fourth lens unit move, and
at the wide angle end when focused to a first object, the following conditional expression (1) is satisfied:

$$\phi_{L1} < \phi_{3GL1} \quad (1)$$

where, $\phi_{L1}$ denotes an effective diameter of a lens surface positioned nearest to object of the zoom lens, $\phi_{3GL1}$ denotes an effective diameter of a lens surface positioned nearest to object of the third lens unit, the first object is an object when an object-point distance is 1000 mm, here the object-point distance is a distance from a lens surface positioned nearest to object of the zoom lens, up to the object, and the effective diameter is the maximum diameter of a range on a target lens surface, through which a light ray contributing to image formation passes.

Moreover, another zoom image pickup apparatus according to the present invention comprises, a mount portion, a zoom lens which forms an image of light incident from the mount portion, and an image pickup element which is disposed at an image forming position, wherein the zoom lens includes in order from an object side, a first lens unit having a positive refractive power, a second lens unit having a negative refractive power, a third lens unit having a positive refractive power, a fourth lens unit having a negative refractive power, and a fifth lens unit having a positive refractive power, and the fourth lens unit is a focusing lens unit, and at a time of zooming from a wide angle end to a telephoto end, only the second lens unit and the fourth lens unit move, and the first lens unit, the third lens unit, and the fifth lens unit are fixed, and the following conditional expression (13) is satisfied:

$$|(y_{w7d'} - y_{w7d})/P|/(1/N) < 250 \quad (13)$$

where, a side of the mount portion is let to be an object side and a side of the image pickup element is let to be an image side, each of $y_{w7d}$ and $y_{w7d'}$ is a height of a predetermined light ray at a position at which the predetermined light ray intersects an image plane, and $y_{w7d}$ denotes a light-ray height when focused to the first object and $y_{w7d'}$ denotes a light-ray height in a defocused state, here the defocused state is a state in which the focusing lens unit is moved by $\Delta_{s2}$ when focused to the first object, and $\Delta_{s2} = 10 \times P$, $$0.0008 < P < 0.005, 0.05 < 1/N < 1,$$

where,

N denotes the number of pixels (unit millions of pixels) of the image pickup element, P denotes a pixel pitch (unit mm) of the image pickup element, the predetermined light ray is a light ray with an angle of view of 7 degrees at the wide angle end, which passes through a center of a lens surface nearest to object of the zoom lens, the first object is an object when an object-point distance is 1000 mm, here the object-point distance is a distance from a lens surface positioned nearest to object of the zoom lens, up to the object.

BRIEF DESCRIPTION OF THE DRAWINGS

FIG. 3A, FIG. 3B, FIG. 3C, FIG. 3D, FIG. 3E, FIG. 3F, FIG. 3G, FIG. 3H, FIG. 3I, FIG. 3J, FIG. 3K, and FIG. 3L are aberration diagrams at the time of focusing to the first object, of the zoom lens according to the example 1;

FIG. 7A, FIG. 7B, FIG. 7C, FIG. 7D, FIG. 7E, FIG. 7F, FIG. 7G, FIG. 7H, FIG. 7I, FIG. 7J, FIG. 7K, and FIG. 7L are aberration diagrams at the time of focusing to the first object, of the zoom lens according to the example 3;

FIG. 8A, FIG. 8B, and FIG. 8C are cross-sectional views along an optical axis showing an optical arrangement at the time of focusing to a first object, of a zoom lens according to an example 4;

FIG. 9A, FIG. 9B, FIG. 9C, FIG. 9D, FIG. 9E, FIG. 9F, FIG. 9G, FIG. 9H, FIG. 9I, FIG. 9J, FIG. 9K, and FIG. 9L are aberration diagrams at the time of focusing to the first object, of the zoom lens according to the example 4;

FIG. 11A, FIG. 11B, FIG. 11C, FIG. 11D, FIG. 11E, FIG. 11F, FIG. 11G, FIG. 11H, FIG. 11I, FIG. 11J, FIG. 11K, and FIG. 11L are aberration diagrams at the time of focusing to the first object, of the zoom lens according to the example 5;

FIG. 13A, FIG. 13B, FIG. 13C, FIG. 13D, FIG. 13E, FIG. 13F, FIG. 13G, FIG. 13H, FIG. 13I, FIG. 13J, FIG. 13K, and FIG. 13L are aberration diagrams at the time of focusing to the first object, of the zoom lens according to the example 6;

FIG. 15A, FIG. 15B, FIG. 15C, FIG. 15D, FIG. 15E, FIG. 15F, FIG. 15G, FIG. 15H, FIG. 15I, FIG. 15J, FIG. 15K, and FIG. 15L are aberration diagrams at the time of focusing to the first object, of the zoom lens according to the example 7;

FIG. 17A, FIG. 17B, FIG. 17C, FIG. 17O, FIG. 17E, FIG. 17F, FIG. 17G, FIG. 17H, FIG. 17I, FIG. 17J, FIG. 17K, and FIG. 17L are aberration diagrams at the time of focusing to the first object, of the zoom lens according to the example 8;

DETAILED DESCRIPTION OF THE INVENTION

Figure 1A:
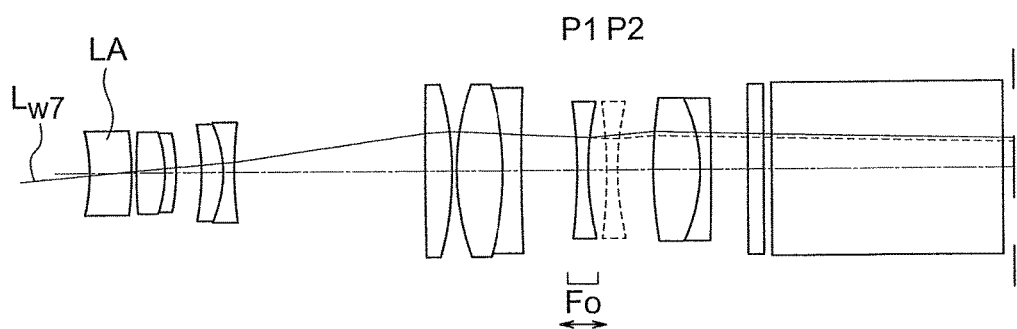
FIG. 1A and FIG. 1B are diagrams for explaining $y_{w7d}$ and $y_{w7d'}$.

A zoom image pickup apparatus according to the present embodiment includes a mount portion, a zoom lens which forms an image of light incident from the mount portion, and an image pickup element which is disposed at an image forming position, wherein the zoom lens includes in order from an object side, a first lens unit having a positive refractive power, a second lens unit having a negative refractive power, a third lens unit having a positive refractive power, a fourth lens unit having a negative refractive power, and a fifth lens unit having a positive refractive power, and the fourth lens unit is a focusing lens unit, and at a time of zooming from a wide angle end to a telephoto end, at least the second lens unit and the fourth lens unit move, and at the wide angle end when focused to a first object, the following conditional expression (1) is satisfied:

$$\phi_{L1} < \phi_{3GL1} \quad (1)$$

where, $\phi_{L1}$ denotes an effective diameter of a lens surface positioned nearest to object of the zoom lens, $\phi_{3GL1}$ denotes an effective diameter of a lens surface positioned nearest to object of the third lens unit, the first object is an object when an object-point distance is 1000 mm, here the object-point distance is a distance from a lens surface positioned nearest to object of the zoom lens, up to the object, and the effective diameter is the maximum diameter of a range on a target lens surface, through which a light ray contributing to image formation passes.

In the zoom image pickup apparatus of the present embodiment, the zoom lens includes in order from the object side, the first lens unit having a positive refractive power, the second lens unit having a negative refractive power, the third lens unit having a positive refractive power, the fourth lens unit having a negative refractive power, and the fifth lens unit having a positive refractive power.

The zoom lens arranged in such manner can be used as an image pickup optical system for endoscope. When an image pickup optical system for endoscope is combined with an endoscope optical system, an entrance-pupil position is restricted. Generally, an image pickup optical system for endoscope does not have an aperture stop. Therefore, an aperture of an image-forming light beam is determined by an exit-pupil diameter of the endoscope optical system. An eye-point of an endoscope optical system is a position where generally there is no problem for visual observation, such as a position few mm away from an eyepiece end surface.

Since the first lens unit is near the exit-pupil position of the endoscope optical system, an outer diameter of the first lens unit becomes small. In this case, since the first lens unit becomes small-sized, from size point of view, the first lens unit becomes a candidate for the focusing lens unit.

However, the first lens unit is a lens unit which is effective for correction of a spherical aberration. Exerting the effect for correction of the spherical aberration signifies that the first lens unit is a lens unit which substantially affects the spherical aberration. Therefore, when the first lens unit is let to be the focusing lens unit, the spherical aberration fluctuates substantially with the movement of the lens unit.

Therefore, the fourth lens unit is let to be the focusing lens unit. By making such arrangement, a position of the lens unit that moves becomes away from the exit-pupil position of the endoscope optical system. Moreover, since the refractive power of the third lens unit is a positive refractive power, it is possible to suppress a height of a light ray at the fourth lens unit to be low. As a result of this, it is possible to suppress the fluctuation in the spherical aberration at the time of focusing.

Furthermore, by letting the refractive power of the focusing lens unit to be a negative refractive power, it is possible to make a focusing sensitivity high. As a result of this, it is possible to suppress an increase in the amount of movement of the focusing lens unit at the time of focusing.

Furthermore, the fifth lens unit is disposed on the image side of the fourth lens unit, and the refractive power of the fifth lens unit is let to be a positive refractive power. In this case, since the fifth lens unit functions as a reduction optical system, it is possible to make small an aberration fluctuation at the time of focusing, in the fifth lens unit.

Moreover, since a substantial zooming effect emanates by the second lens unit and the third lens unit, the second lens unit and the third lens unit become the main variator. Here, when the focusing lens unit is positioned on the object side of the main variator, an amount of variation in the image height and an amount of variation in the image position due to the movement of the focusing lens unit vary substantially according to the movement of the main variator. In such manner, the variation in the image height and the variation in the image position due to the movement of the focusing lens unit are affected substantially by a state of the movement of the main variator.

For this reason, by letting the fourth lens unit to be the focusing lens unit, the focusing lens unit is disposed next to the main variator. Consequently, since an effect of the main variator can be ignored, the focusing sensitivity ceases to vary substantially. Moreover, since the variation in the focusing sensitivity being small, it becomes easy to control the movement of the focusing lens unit.

Moreover, by satisfying conditional expression (1), since the effective diameter of the third lens unit on the image side of first lens unit is made large, it becomes easy to reduce vignetting of an off-axis light beam reaching an image pickup surface when the zoom lens is connected to an eyepiece portion of an endoscope etc.

Moreover, in the zoom image pickup apparatus according to the present embodiment, it is preferable that the following conditional expression (2) be satisfied:

$$-4.5 < f_4/f_5 < -0.2 \qquad (2)$$

where, $f_4$ denotes a focal length of the fourth lens unit, and
$f_5$ denotes a focal length of the fifth lens unit.

Conditional expression (2) is a conditional expression which regulates a ratio of the refractive power of the fourth lens unit and the refractive power of the fifth lens unit. By satisfying conditional expression (2), it is possible to set appropriately each of the refractive power of the fourth lens unit and the refractive power of the fifth lens unit. Consequently, in the fifth lens unit, it is possible to correct favorably an aberration which occurs in the fourth lens unit. As a result of this, it is possible to maintain a favorable optical performance in the zoom lens.

The refractive power of the fourth lens unit being a negative refractive power, a light ray emerged from the fourth lens unit advances to be moving away from an optical axis. By exceeding a lower limit value of conditional expression (2), even an aberration which occurs due to the light ray advancing to be moving away from the optical axis can be corrected favorably in the fifth lens unit. It is possible to carry out favorably a correction of a coma in particular.

By falling below an upper limit value of conditional expression (2), it is possible to carry out an aberration correction favorably while maintaining appropriately the refractive power of the fourth lens unit. Moreover, falling of value below the upper limit value is effective for shortening an overall length of the optical system.

It is preferable that the following conditional expression (2') be satisfied instead of conditional expression (2).

$$-2.5 < f_4/f_5 < -0.3 \qquad (2')$$

Furthermore, it is more preferable that the following conditional expression (2") be satisfied instead of conditional expression (2).

$$-1.6 < f_4/f_5 < -0.5 \qquad (2")$$

Moreover, in the zoom image pickup apparatus according to the present embodiment, it is preferable that the following conditional expression (3) be satisfied:

$$0.55 < |\beta_{ctw}| < 5 \qquad (3)$$

where, $\beta_{ctw} = (1-\beta_{fcw} \times \beta_{fcw}) \times \beta_w' \times \beta_w'$, here each of $\beta_{fcw}$ and $\beta_w'$ is a lateral magnification at the wide angle end when focused to the first object, and $\beta_{fcw}$ denotes a lateral magnification of the fourth lens unit and $\beta_w'$ denotes a lateral magnification of a lens unit positioned on an image side of the fourth lens unit, the first object is an object when the object-point distance is 1000 mm, and the object-point distance is a distance from a lens surface positioned nearest to object of the zoom lens up to an object.

Conditional expression (3) is a conditional expression related to the focusing sensitivity at the wide angle end. As mentioned above, the focusing sensitivity is the amount indicating the amount of movement of the image plane with respect to the amount of movement of the focusing lens unit.

By exceeding a lower limit value of conditional expression (3), it is possible to suppress the increase in the amount of movement of the focusing lens unit at the time of focusing. As a result of this, it is possible to suppress the fluctuation in an astigmatism at the time of focusing. Moreover, since it is possible to suppress the increase in the amount of movement of the focusing lens unit, it is possible to make small a space for the movement of the focusing lens unit. As a result of this, it is possible to carry out small-sizing of the zoom lens and small-sizing of the zoom image pickup apparatus.

By falling below an upper limit value of conditional expression (3), it is possible to suppress the astigmatism from occurring in the focusing lens unit.

It is preferable that the following conditional expression (3') be satisfied instead of conditional expression (3).

$$0.555 < |\beta_{ctw}| < 4 \qquad (3')$$

Furthermore, it is more preferable that the following conditional expression (3") be satisfied instead of conditional expression (3).

$$0.555 < |\beta_{ctw}| < 3 \qquad (3")$$

Moreover, in the zoom image pickup apparatus according to the present embodiment, it is preferable that a lens unit having a negative refractive power which satisfies the following conditional expression (4) is positioned on the object side of a lens unit having a positive refractive power:

$$0.1 < d_{ng}/d_{pg} < 0.9 \qquad (4)$$

where, each of $d_{ng}$ and $d_{pg}$ is a thickness on an optical axis of a lens unit, and $d_{ng}$ denotes a thickness of a lens unit having the largest negative refractive power from among thicknesses of lens units positioned on the object side of the fourth lens unit, and $d_{pg}$ denotes a thickness of the lens unit having the largest positive refractive power from among thicknesses of lens units positioned on the object side of the fourth lens unit.

Conditional expression (4) is a conditional expression related to a ratio of the thickness on the optical axis of the two lens units. One is a thickness of a predetermined positive lens unit and the other is a thickness of a predetermined negative lens unit. The predetermined positive lens unit is a lens unit having the largest positive refractive power from among the lens units positioned on the object side of the fourth lens unit. The predetermined negative lens unit is a lens unit having the largest negative refractive power from among the lens units positioned on the object side of the fourth lens unit.

When the lens units are arranged in order of the lens unit having a negative refractive power and the lens unit having a positive refractive power, from the object side, a light ray is diverged at the lens unit having the negative refractive power. In this case, the lens unit having a positive refractive power is sought to correct an aberration at a position at which the height of a light ray is high. Particularly, since a diameter of a light beam becomes large for an axial light beam, the lens unit having a positive refractive power is sought to correct the spherical aberration. Conditional expression (4) is a conditional expression for correcting the spherical aberration favorably while suppressing an increase in the overall length of the optical system.

By exceeding a lower limit value of conditional expression (4), it is possible to shorten the overall length of the optical system. By falling below an upper limit value of conditional expression (4), it is possible to carry out the correction of the spherical aberration favorably.

It is preferable that the following conditional expression (4') be satisfied instead of conditional expression (4).

$$0.15 < d_{ng}/d_{pg} < 0.7 \qquad (4')$$

Furthermore, it is more favorable that the following conditional expression (4") be satisfied instead of conditional expression (4).

$$0.17 < d_{ng}/d_{pg} < 0.55 \quad (4'')$$

Moreover, in the zoom image pickup apparatus according to the present embodiment, it is preferable that the following conditional expression (5) be satisfied:

$$1 < \phi_{fc}/\phi_{L1} < 3 \quad (5)$$

where, each of $\phi_{fc}$ and $\phi_{L1}$ is an effective diameter at the wide angle end when focused to the first object, and $\phi_{fc}$ denotes an effective diameter of a lens surface positioned nearest to object of the focusing lens unit, $\phi_{L1}$ denotes the effective diameter of a lens surface positioned nearest to object of the zoom lens, the first object is an object when an object-point distance is 1000 mm, where the object-point distance is the distance from the lens surface positioned nearest to object of the zoom lens, up to the object, and the effective diameter is the maximum diameter of a range on a target lens surface, through which a light ray contributing to image formation passes.

Conditional expression (5) is a conditional expression related to a ratio of two effective diameters. One is the effective diameter of the lens surface positioned nearest to object in the focusing lens unit and the other is the effective diameter of the lens surface positioned nearest to object in the zoom lens. It is preferable to set the effective diameter of the zoom lens for achieve both of guiding an optical path of an exit pupil to the image pickup element without vignetting or with small vignetting, and small-sizing.

By exceeding a lower limit value of conditional expression (5), it is possible to prevent the first lens unit from becoming large-sized. In such manner, exceeding the lower limit value of conditional expression (5) is advantageous for small-sizing of the optical system. As a result, it is possible to carry out the correction of the spherical aberration favorably while achieving the small-sizing of the optical system.

By falling below an upper limit value of conditional expression (5), it is possible to carry out the correction of the spherical aberration and coma in the focusing lens unit while preventing the focusing lens unit from becoming large-sized.

It is preferable that the following conditional expression (5') be satisfied instead of conditional expression (5).

$$1 < \phi_{fc}/\phi_{L1} < 2.5 \quad (5')$$

Furthermore, it is more preferable that the following conditional expression (5") be satisfied instead of conditional expression (5).

$$1.1 < \phi_{fc}/\phi_{L1} < 2 \quad (5'')$$

Moreover, in the zoom image pickup apparatus according to the present embodiment, it is preferable that the following conditional expression (6) be satisfied:

$$-4 < f_4/f_{Lw} < -0.4 \quad (6)$$

where, $f_4$ denotes a focal length of the fourth lens unit, $f_{Lw}$ denotes a focal length at the wide angle end of the zoom lens when focused to the first object, the first object is an object when an object-point distance is 1000 mm, and the object-point distance is a distance from a lens surface positioned nearest to object of the zoom lens up, to the object.

Conditional expression (6) is a conditional expression in which a ratio of two focal lengths is taken. One is the focal length of the fourth lens unit and the other is the focal length of the zoom lens. The focal length of the zoom lens is a focal length at the wide angle end when focused to the first object.

By exceeding a lower limit value of conditional expression (6), since it is possible to set favorably Petzval sum for the fourth lens unit, it is possible to correct the astigmatism favorably. Accordingly, it is possible to maintain a favorable optical performance.

It is effective to fall below an upper limit value of conditional expression (6) for shortening the overall length of the optical system, and accordingly, it is possible to make small the amount of movement of the fourth lens unit.

It is preferable that the following conditional expression (6') be satisfied instead of conditional expression (6).

$$-3 < f_4/f_{Lw} < -0.5 \quad (6')$$

Furthermore, it is more preferable that the following conditional expression (6") be satisfied instead of conditional expression (6).

$$-1.2 < f_4/f_{Lw} < -0.7 \quad (6'')$$

Moreover, in the zoom image pickup apparatus according to the present embodiment, it is preferable that the following conditional expression (7) be satisfied:

$$1 < f_5/f_{Lw} < 3 \quad (7)$$

where, $f_5$ denotes the focal length of the fifth lens unit, $f_{Lw}$ denotes the focal length at a wide angle end of the zoom lens when focused to the first object, and the first object is an object when an object-point distance is 1000 mm, here the object-point distance is a distance from a lens surface positioned nearest to object of the zoom lens, up to the object.

Conditional expression (7) is a conditional expression in which a ratio of two focal lengths is taken. One is the focal length of the fifth lens unit and the other is the focal length of the zoom lens unit. The focal length of this zoom lens is a focal length at the wide angle end when focused to the first object.

In the fifth lens unit, an aberration which occurs due to an off-axis light ray can be corrected favorably. Moreover, imparting an appropriate refractive power to the fifth lens unit is effective for shortening the overall length of the optical system.

By exceeding a lower limit value of conditional expression (7), it is possible to correct the coma favorably. By falling below an upper limit value of conditional expression (7), it is possible to achieve shortening of the overall length of the optical system.

It is preferable that the following conditional expression (7') be satisfied instead of conditional expression (7)

$$1 < f_5/f_{Lw} < 2.7 \quad (7')$$

Furthermore, it is more preferable that the following conditional expression (7") be satisfied instead of conditional expression (7).

$$1.1 < f_5/f_{Lw} < 2.2 \quad (7'')$$

Moreover, in the zoom image pick apparatus according to the present embodiment, it is preferable that the following conditional expression (8) be satisfied:

$$-5 < f_{ng}/f_{pg} < -0.5 \quad (8)$$

where, $f_{ng}$ denotes a focal length of a lens having the largest negative refractive power from among focal lengths of lens units positioned on the object side of the fourth lens unit, and $f_{pg}$ denotes a focal length of a lens having the largest positive refractive power from among focal lengths of lens units positioned on the object side of the fourth lens unit.

Conditional expression (8) is a conditional expression related to a ratio of the focal lengths of the two lens units. One is the focal length of the predetermined negative lens unit and the other is the focal length of the predetermined positive lens unit. The predetermined negative lens unit is the lens unit having the largest negative refractive power from among the lens units positioned on the object side of the fourth lens unit. The predetermined positive lens unit is the lens unit having the largest positive refractive power from among the lens unit positioned on the object side of the fourth lens unit.

For example, the second lens unit corresponds to the predetermined negative lens unit, and the third lens unit corresponds to the predetermined positive lens unit. In this case, conditional expression (8) becomes a conditional expression related to a ratio of the focal lengths of the second lens unit and the focal lengths of the third lens unit.

By satisfying conditional expression (8), it is possible to balance the refractive power of the predetermined negative lens unit and the refractive power of the predetermined positive lens unit. In this case, since it is possible to set Petzval sum favorably, it is possible to correct the astigmatism favorably. Accordingly, it is possible to maintain a favorable optical performance.

It is preferable that the following conditional expression (8') be instead of conditional expression (8).

$$-4 < f_{ng}/f_{pg} < -0.9 \quad (8')$$

Furthermore, it is more preferable that the following conditional expression (8") be satisfied instead of conditional expression (8).

$$-3.5 < f_{ng}/f_{pg} < -1 \quad (8")$$

Moreover, in the zoom image pickup apparatus according to the present embodiment, it is preferable that only the fourth lens unit move at the time of focusing, and the following conditional expression (9) be satisfied:

$$0.8 < |\beta_{ctt}|/|\beta_{ctw}| < 1.8 \quad (9)$$

where, $\beta_{ctt} = (1-\beta_{fct} \times \beta_{fct}) \times \beta_t' \times \beta_t'$,
$\beta_{ctw} = (1-\beta_{fcw} \times \beta_{fcw}) \times \beta_w' \times \beta_w'$, here each of $\beta_{fct}$ and $\beta_t'$ is a lateral magnification at the telephoto end when focused to the first object, and $\beta_{fct}$ denotes a lateral magnification of the fourth lens unit and $\beta_t'$ denotes a lateral magnification of a lens unit positioned on an image side of the fourth lens unit, each of $\beta_{fcw}$ and $\beta_w'$ is the lateral magnification at the wide angle end when focused to the first object, and $\beta_{fcw}$ denotes the lateral magnification of the fourth lens unit and $\beta_w'$ denotes the lateral magnification of a lens unit positioned on an image side of the fourth lens unit, and the first object is an object when the object-point distance is 1000 mm, here the object-point distance is a distance from a lens surface positioned nearest to object of the zoom lens up to an object.

Conditional expression (9) is a conditional expression related to a ratio of the focusing sensitivity at the telephoto end and the focusing sensitivity at the wide angle end. As mentioned above, the focusing sensitivity is the amount indicating the amount of movement of the image plane with respect to the amount of movement of the focusing lens unit.

When conditional expression (9) is satisfied, the fluctuation in the focusing sensitivity is suppressed at both the telephoto end and the wide angle end. In such manner, since the variation in the focusing sensitivity being small, the amount of movement of the image plane with respect to the amount of movement of the focusing lens unit does not vary substantially according to a state. Consequently, it becomes easy to control the movement of the focusing lens unit.

It is preferable that the following conditional expression (9') be satisfied instead of conditional expression (9)

$$0.9 < |\beta_{ctt}|/|\beta_{ctw}| < 1.5 \quad (9')$$

Furthermore, it is more preferable that the following conditional expression (9") be satisfied instead of conditional expression (9).

$$0.9 < |\beta_{ctt}|/|\beta_{ctw}| < 1.2 \quad (9")$$

Moreover, in the zoom image pickup apparatus according to the present embodiment, it is preferable that the following conditional expression (10) be satisfied:

$$0.03 < \phi_{L1}/f_{Lt} < 0.2 \quad (10)$$

where, $\phi_{L1}$ is the effective diameter of a lens surface positioned nearest to object of the zoom lens, and denotes an effective diameter at the wide angle end when focused to the first object, $f_{Lt}$ denotes a focal length at the telephoto end of the zoom lens when focused to the first object, the first object is an object when an object-point distance is 1000 mm, where the object-point distance is the distance from the lens surface positioned nearest to object of the zoom lens, up to the object, and the effective diameter is the maximum diameter of a range on a target lens surface, through which a light ray contributing to image formation passes.

Conditional expression (10) is a conditional expression in which a ratio of the effective diameter of the lens surface positioned nearest to the object of the zoom lens and the focal length of the zoom lens at the telephoto end when focused to the first object is taken. The effective diameter of a lens is the maximum diameter of a range through which a light contributing to image formation at the wide angle end when focused to the first object passes, or in other words, is a diameter regulated by a marginal ray.

When conditional expression (10) is satisfied, since it is possible to make small the effective diameter of the lens surface positioned nearest to object of the zoom lens, it is possible to achieve small-sizing of the optical system.

It is preferable that the following conditional expression (10') be satisfied instead of conditional expression (10).

$$0.04 < \phi_{L1}/f_{1t} < 0.18 \quad (10')$$

Furthermore, it is more preferable that the following conditional expression (10") be satisfied instead of conditional expression (10).

$$0.05 < \phi_{L1}/f_{1t} < 0.15 \quad (10")$$

Moreover, in the zoom image pickup apparatus according to the present embodiment, it is preferable that, at the time of zooming, only the second lens unit and the fourth lens unit move, and the first lens unit, the third lens unit, and the fifth lens unit be fixed.

A lens unit having a positive refractive power is disposed on the object side of the second lens unit and the object side of the fourth lens unit. Since light rays are converged at a position of the second lens unit and a position of the fourth lens unit, it is possible to make the second lens unit and the fourth lens unit small-sized. Therefore, by letting the second lens unit and the fourth lens unit to be movable lens units, it is possible to arrange the whole optical system to be small-sized. Moreover, since the number of movable lens units is let to be two, it is possible to make a mechanical arrangement and a control of the movable lens units comparatively simple.

Moreover, in the zoom image pickup apparatus according to the present embodiment, it is preferable that the third lens unit include a positive lens which is disposed nearest to object and a cemented lens which is disposed nearest to image.

When an image pickup optical system for endoscope is combined with an endoscope optical system, the entrance-pupil position is restricted. Generally, an image pickup optical system for endoscope does not have an aperture stop. Therefore, an aperture of an image-forming light beam is determined by an exit-pupil diameter of the endoscope optical system. An eye-point of an endoscope optical system is a position where generally there is no problem for visual observation, such as a position few mm away from an eyepiece end surface.

A light ray incident on the third lens unit is diverged at the second lens unit having a negative refractive power. Since a height of an axial light ray in the third lens unit becomes high, correction of a spherical aberration becomes difficult. For this reason, a positive lens of which both sides are air-contact surfaces is to be disposed nearest to object. Accordingly, since bending becomes possible at two air-contact surfaces, it is possible to correct the spherical aberration favorably. Moreover, by disposing the cemented lens nearest to image, it is possible to correct favorably a longitudinal chromatic aberration.

Moreover, at least one cemented surface having a negative refractive power may further be provided in the third lens unit. By making such arrangement, it is possible to correct an astigmatism favorably.

Moreover, in the zoom image pickup apparatus according to the present embodiment, it is preferable that a rearmost lens unit be disposed nearest to image, and the rearmost lens unit include a positive lens which is disposed nearest to object, and a negative lens which is disposed nearest to image.

The rearmost lens unit is a lens unit disposed nearest to image in the zoom lens. In the rearmost lens unit, by disposing the lenses in order of the positive lens and the negative lens from the object side, it is possible to diverge by the negative lens a light ray that was converged by the positive lens. As a result of this, it is possible to make gentle an angle of a light ray passing through the rearmost lens unit, with respect to the optical axis. Therefore, it is possible to suppress an occurrence of an off-axis aberration in particular.

Moreover, in the zoom image pickup apparatus according to the present embodiment, it is preferable that the following conditional expression (11) be satisfied:

$$-5<(r_{4Gff}+r_{4Gfb})/(r_{4Gff}-r_{4Gfb})<5 \quad (11)$$

where, $r_{4Gff}$ denotes a radius of curvature of an object-side lens surface of a lens positioned nearest to object in the fourth lens unit, and $r_{4Gfb}$ denotes a radius of curvature of an image-side lens surface of a lens positioned nearest to image in the fourth lens unit.

Conditional expression (11) is a conditional expression related to a shape of the focusing lens unit. When conditional expression (11) is satisfied, the shape of the focusing lens unit becomes a shape suitable for correcting the spherical aberration. Therefore, it is possible to suppress a fluctuation in the spherical aberration at the time of focusing.

Moreover, it is preferable that the following conditional expression (11') be satisfied instead of conditional expression (11).

$$-4<(r_{4Gff}+r_{4Gfb})/(r_{4Gff}-r_{4Gfb})<4 \quad (11')$$

Furthermore, it is more preferable that the following conditional expression (11") be satisfied instead of conditional expression (11).

$$-3<(r_{4Gff}+r_{4Gfb})/(r_{4Gff}-r_{4Gfb})<2 \quad (11")$$

Moreover, in the zoom image pickup apparatus according to the present embodiment, it is preferable that the following conditional expression (12) be satisfied:

$$-5<(r_{1f}+r_{1b})/(r_{1f}-r_{1b})<5 \quad (12)$$

where, $r_{1f}$ denotes a radius of curvature of an object-side lens surface of a lens positioned nearest to image, and $r_{1b}$ denotes a radius of curvature of an image-side lens surface of a lens positioned nearest to image.

Conditional expression (12) is a conditional expression related to a shape of a lens positioned nearest to image.

By exceeding a lower limit value of conditional expression (12), it is possible to correct the astigmatism favorably. As a result of this, it is possible to maintain a favorable optical performance. By falling below an upper limit value of conditional expression (12), it is possible to correct the spherical aberration favorably. As a result of this, it is possible maintain a favorable optical performance.

Moreover, it is preferable that the following conditional expression (12') be satisfied instead of conditional expression (12).

$$-3<(r_{1f}+r_{1b})/(r_{1f}-r_{1b})<3 \quad (12')$$

Furthermore, it is more preferable that the following conditional expression (12") be satisfied instead of conditional expression (12).

$$-2<(r_{1f}+r_{1b})/(r_{1f}-r_{1b})<2 \quad (12")$$

Moreover, a zoom image pickup apparatus according to the present embodiment includes amount portion, a zoom lens which forms an image of light incident from the mount portion, and an image pickup element which is disposed at an image forming position, wherein the zoom lens includes in order from an object side, a first lens unit having a positive refractive power, a second lens unit having a negative refractive power, a third lens unit having a positive refractive power, a fourth lens unit having a negative refractive power, and a fifth lens unit having a positive refractive power, and the fourth lens unit is a focusing lens unit, and at the time of zooming from a wide angle end to a telephoto end, only the second lens unit and the fourth lens unit move, and the first lens unit, the third lens unit, and the fifth lens unit are fixed, and the following conditional expression (13) is satisfied:

$$|(y_{w7d}-y_{w7d}')P|/(1/N)<250 \qquad (13)$$

where, a side of the mount portion is let to be an object side and a side of the image pickup element is let to be an image side, each of $y_{w7d}$ and $y_{w7d}'$ is a height of a predetermined light ray at a position at which the predetermined light ray intersects an image plane, and $y_{w7d}$ denotes a light-ray height when focused to the first object and $y_{w7d}'$ denotes a light-ray height in a defocused state, here the defocused state is a state in which the focusing lens unit is moved by $\Delta_{s2}$ when focused to the first object, and $\Delta_{s2}=10\times P$ $$0.0008<P<0.005, 0.05<1/N<1,$$

where,

N denotes the number of pixels (unit millions of pixels) of the image pickup element, P denotes a pixel pitch (unit mm) of the image pickup element, the predetermined light ray is a light ray with an angle of view of 7 degrees at the wide angle end, which passes through a center of a lens surface nearest to object of the zoom lens, and the first object is an object when an object-point distance is 1000 mm, here the object-point distance is a distance from a lens surface positioned nearest to object of the zoom lens, up to the object.

The zoom lens used for the zoom image pickup apparatus according to the present embodiment can be used as an image pickup optical system for endoscope. When an image pickup optical system for endoscope is combined with an endoscope optical system, an entrance-pupil position is restricted. Generally, an image pickup optical system for endoscope does not have an aperture stop. Therefore, an aperture of an image-forming light beam is determined by an exit-pupil diameter. An eye-point of an endoscope optical system is a position where generally, there is no problem for visual observation, such as a position few mm away from an eyepiece end surface.

Since the first lens unit is near the exit-pupil position of the endoscope optical system, an outer diameter becomes small. However, since the first lens unit affects the spherical aberration substantially, it is not preferable for focusing. Therefore, by letting the fourth lens unit to be the focusing lens unit, a position of the focusing lens unit becomes away from the exit-pupil position. Moreover, since the refractive power of the third lens unit is a positive refractive power, it is possible to suppress a height of a light ray at the focusing lens unit to be low. As a result of this, it is possible to suppress the fluctuation in the spherical aberration at the time of focusing.

Furthermore, since the refractive power of the focusing lens unit is a negative refractive power, it is possible to make the focusing sensitivity high. As a result of this, it is possible to suppress an increase in the amount of movement of the focusing lens unit at the time of focusing.

Moreover, the fifth lens unit having a positive refractive power is disposed on the image side of the focusing lens unit (fourth lens unit). In this case, the lens unit having a positive refractive power is disposed next to a lens unit (focusing lens unit) having a negative refractive power. Therefore, it is possible to suppress a fluctuation in an angle of view at the time of focusing.

Moreover, since a substantial zooming effect emanates by the second lens unit and the third lens unit, the second lens unit and the third lens unit become the main variator. Here, when the focusing lens unit is positioned on the object side of the main variator, an amount of variation in the image height and an amount of variation in the image position due to the movement of the focusing lens unit varies substantially according to the movement of the main variator. In such manner, the variation in the image height and the variation in the image position due to the movement of the focusing lens unit are affected substantially by the movement of the main variator.

For this reason, by letting the fourth lens unit to be the focusing lens unit, the focusing lens unit is disposed next to the main variator. Therefore, since an effect of the main variator can be ignored, the focusing sensitivity ceases to vary substantially. Moreover, since the variation in the focusing sensitivity is small, it becomes easy to control the movement of the focusing lens unit.

Figure 1B:
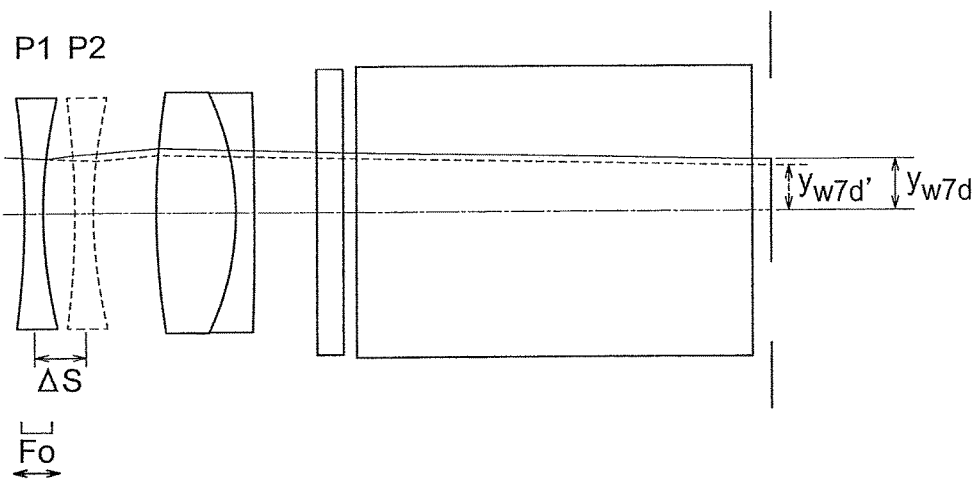
Figure 2A:
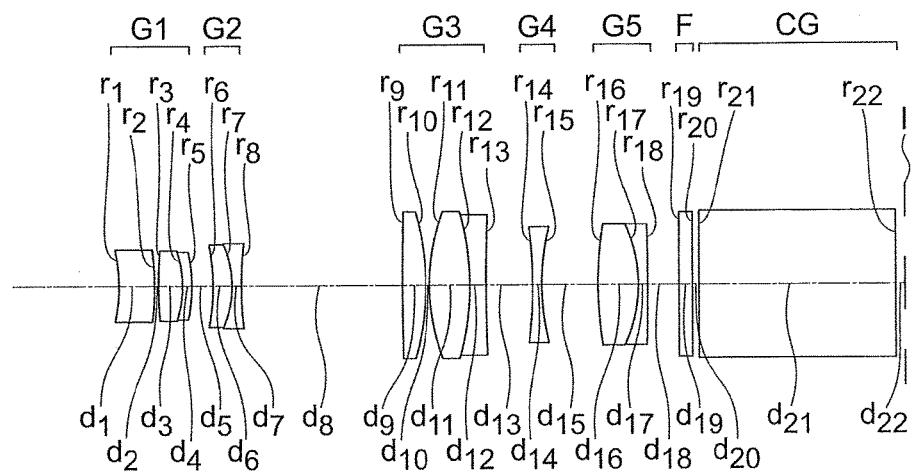
FIG. 2A, FIG. 2B, and FIG. 2C are cross-sectional views along an optical axis showing an optical arrangement at the time of focusing to a first object, of a zoom lens according to an example 1.
Figure 2B:
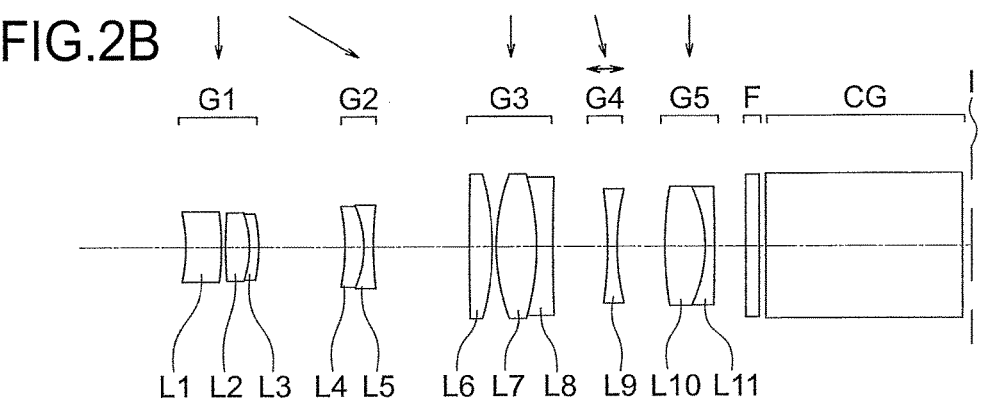
Figure 2C:
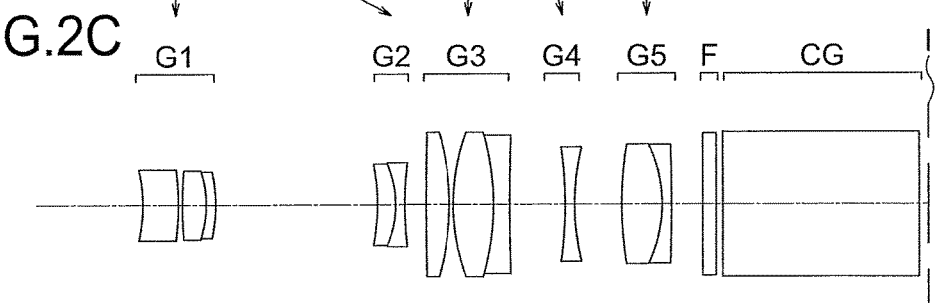
Figure 4A:
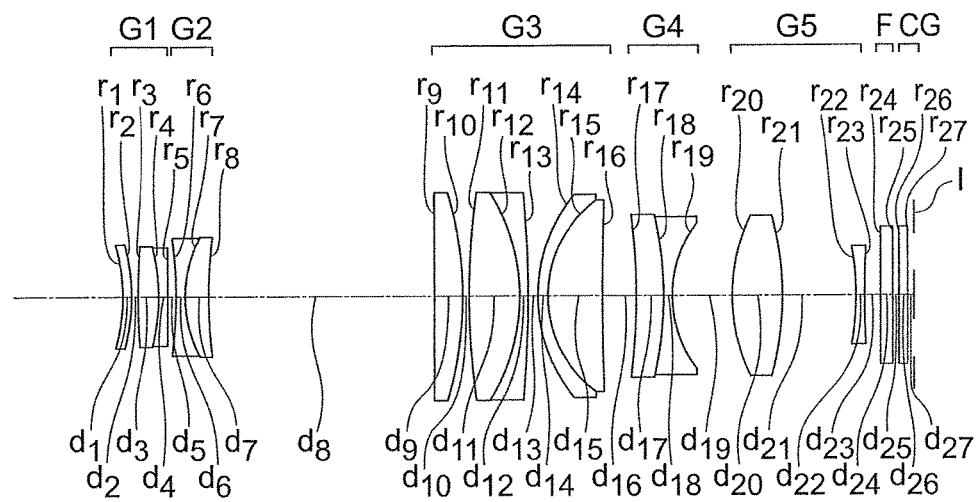
FIG. 4A, FIG. 4B, and FIG. 4C are cross-sectional views along an optical axis showing an optical arrangement at the time of focusing to a first object, of a zoom lens according to an example 2.
Figure 4B:
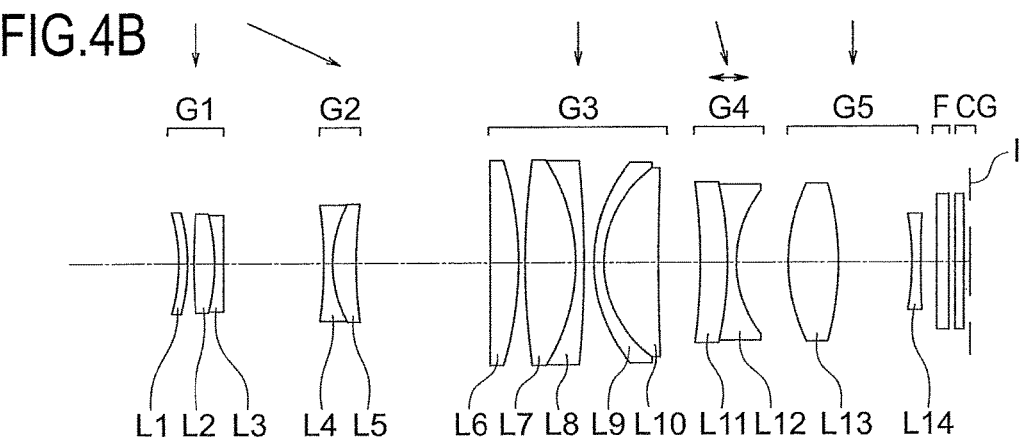
Figure 4C:
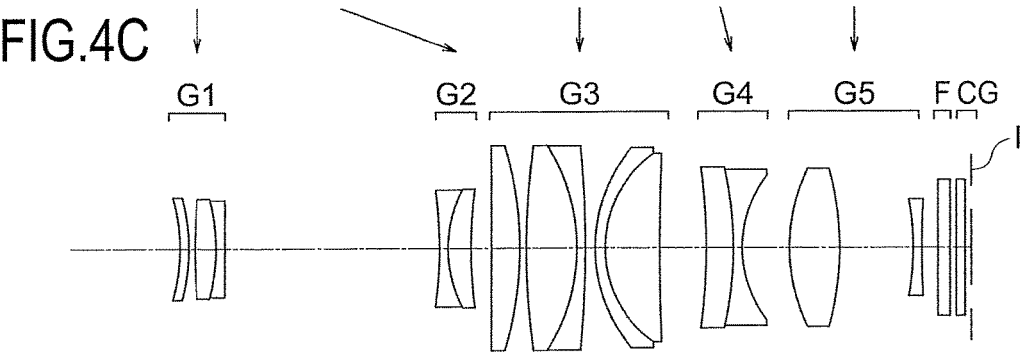
Figure 5A:
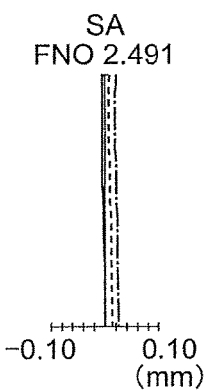
FIG. 5A, FIG. 5B, FIG. 5C, FIG. 5D, FIG. 5E, FIG. 5F, FIG. 5G, FIG. 5H, FIG. 5I, FIG. 5J, FIG. 5K, and FIG. 5L are aberration diagrams at the time of focusing to the first object, of the zoom lens according to the example 2.
Figure 5B:
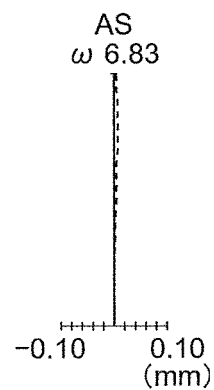
Figure 5C:
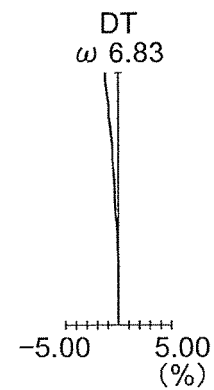
Figure 5D:
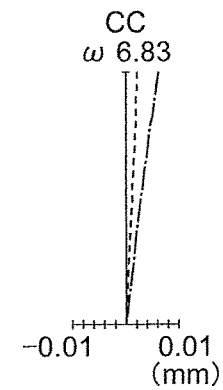
Figure 5E:
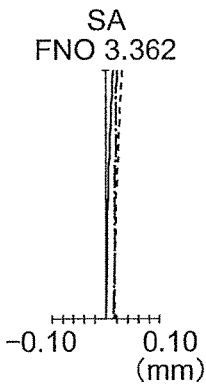
Figure 5F:
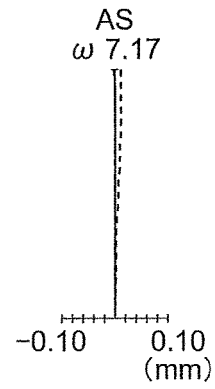
Figure 5G:
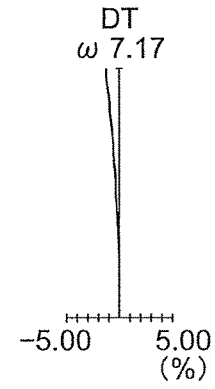
Figure 5H:
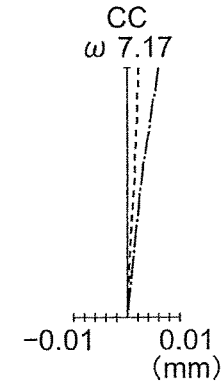
Figure 5I:
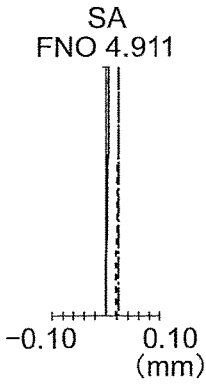
Figure 5J:
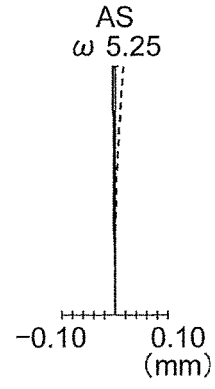
Figure 5K:
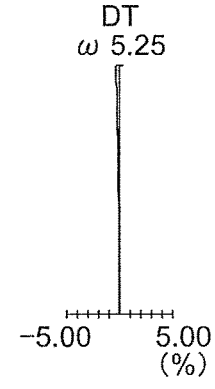
Figure 5L:
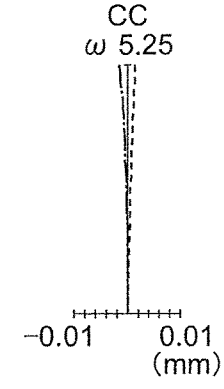
Figure 6A:
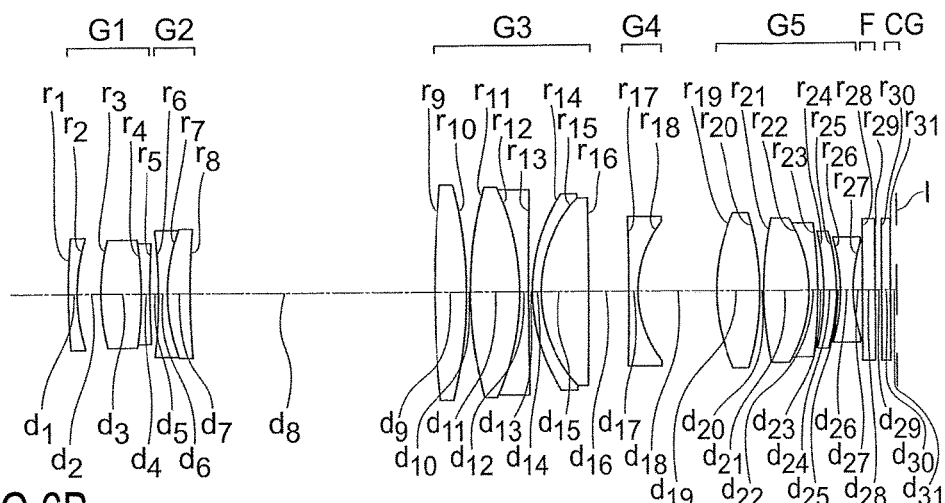
FIG. 6A, FIG. 6B, and FIG. 6C are cross-sectional views along an optical axis showing an optical arrangement at the time of focusing to a first object, of a zoom lens according to an example 3.
Figure 6B:
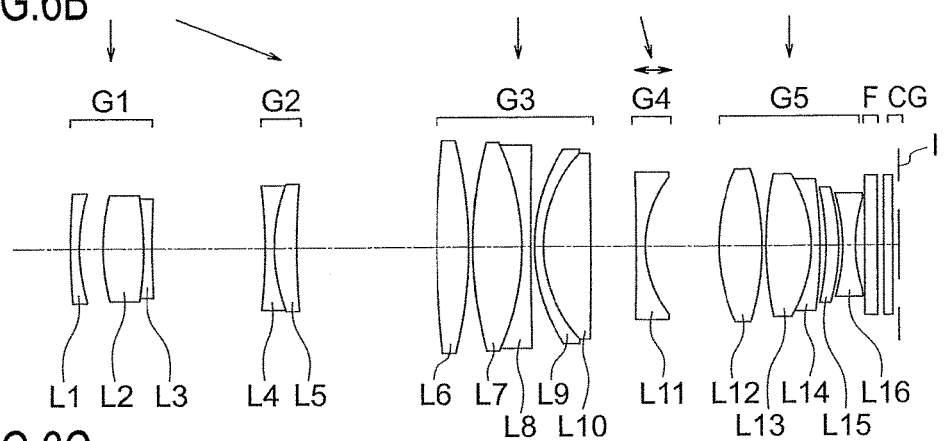
Figure 6C:
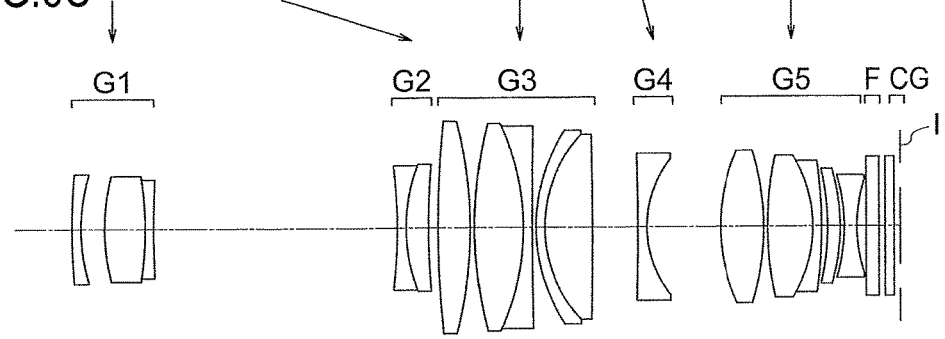
Figure 10A:
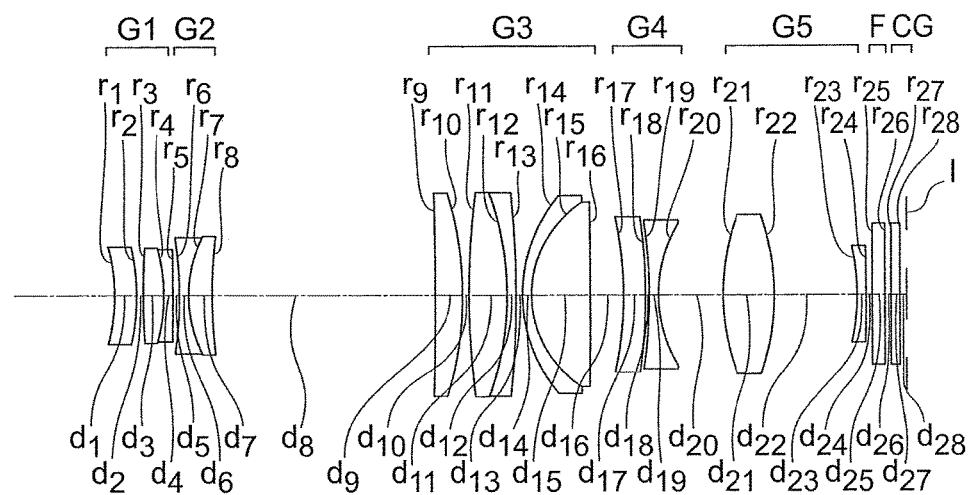
FIG. 10A, FIG. 10B, and FIG. 10O are cross-sectional views along an optical axis showing an optical arrangement at the time of focusing to a first object, of a zoom lens according to an example 5.
Figure 10B:
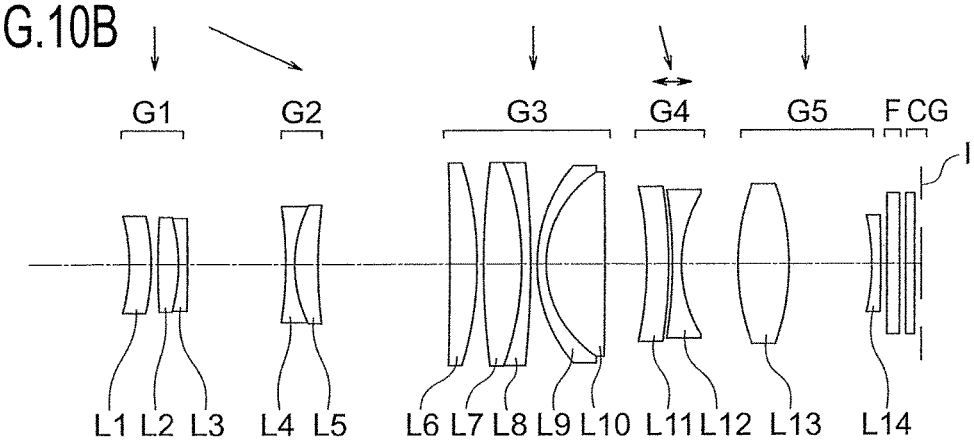
Figure 10C:
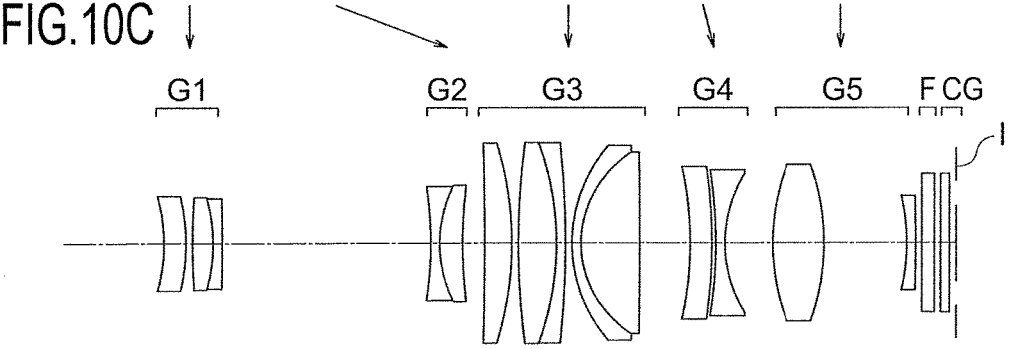
Figure 12A:
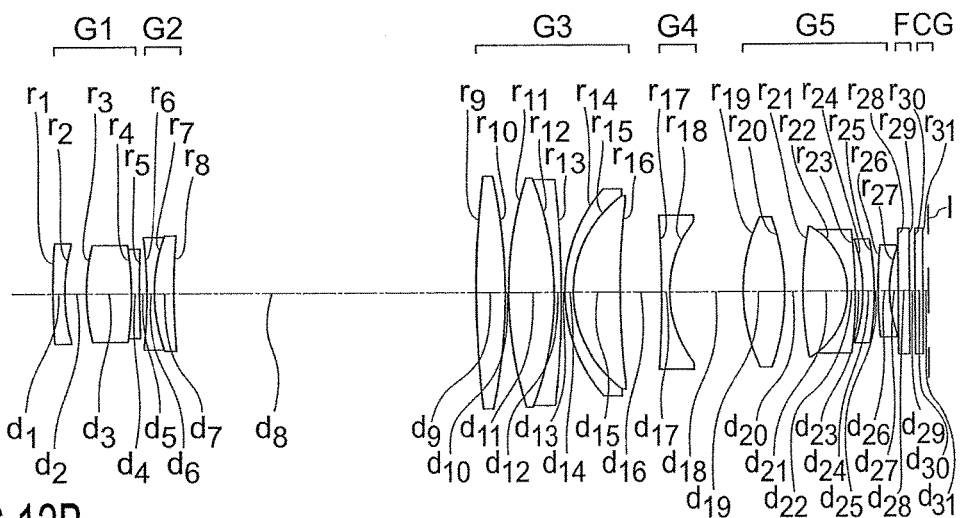
FIG. 12A, FIG. 12B, and FIG. 12C are cross-sectional views along an optical axis showing an optical arrangement at the time of focusing to a first object, of a zoom lens according to an example 6.
Figure 12B:
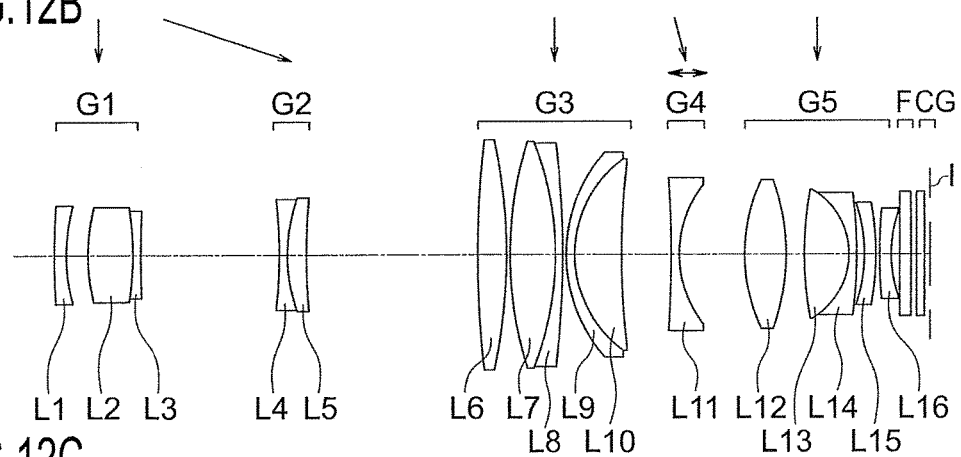
Figure 12C:
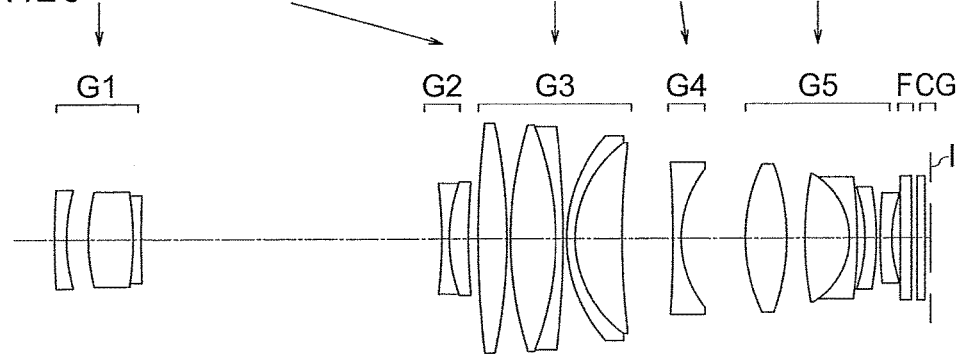
Figure 14A:
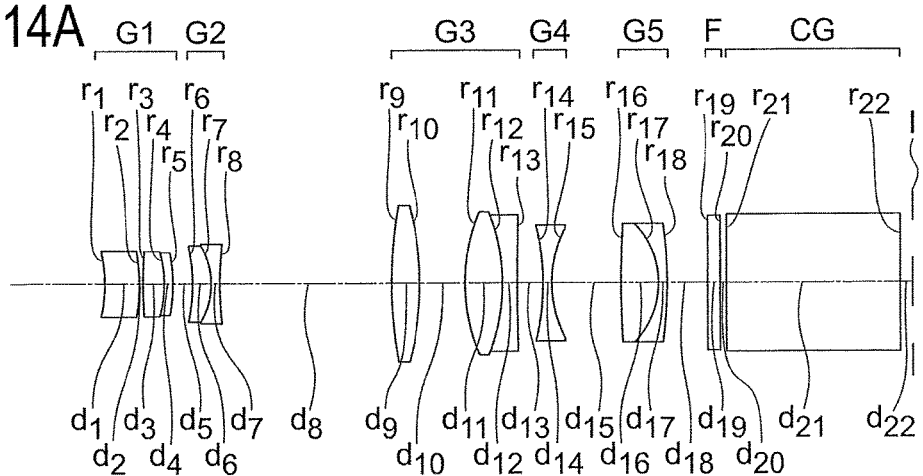
FIG. 14A, FIG. 14B, and FIG. 14C are cross-sectional views along an optical axis showing an optical arrangement at the time of focusing to a first object, of a zoom lens according to an example 7.
Figure 14B:
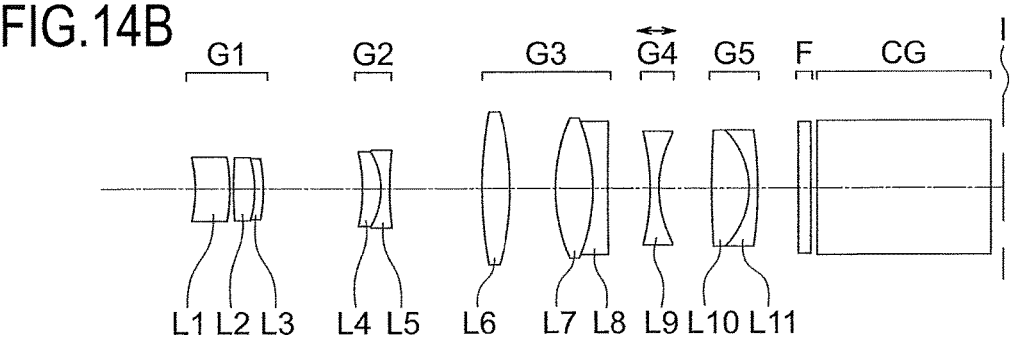
Figure 14C:
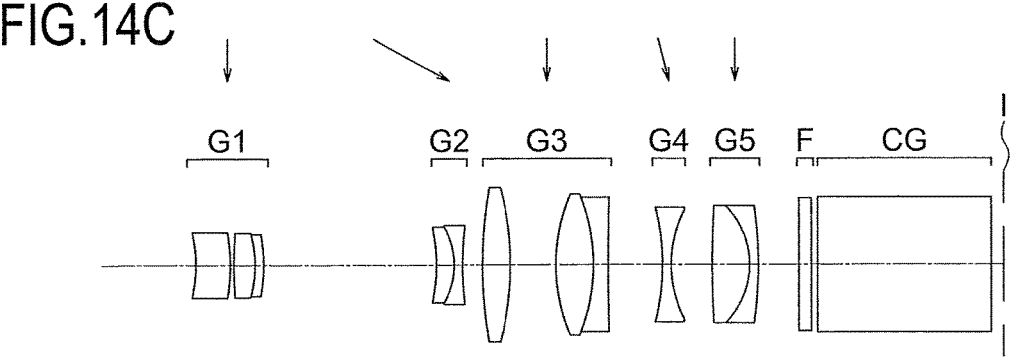
Figure 16A:
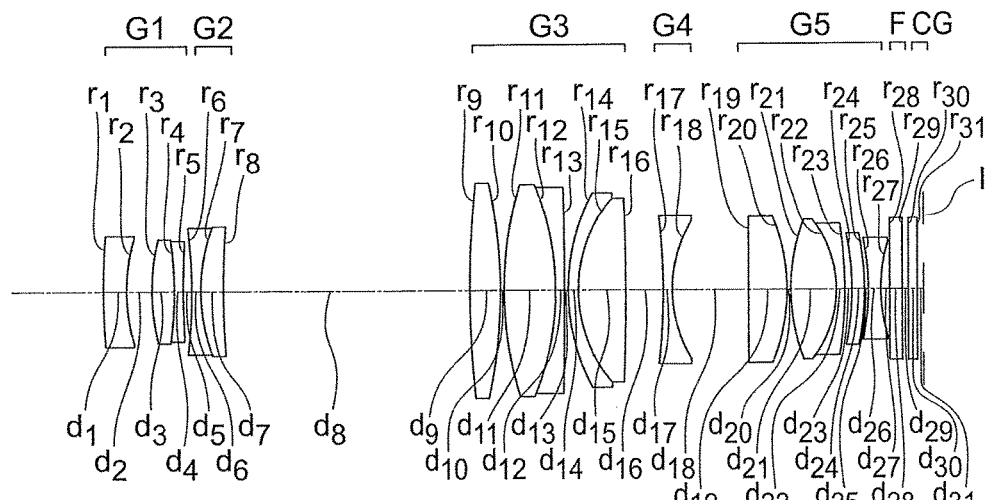
FIG. 16A, FIG. 16B, and FIG. 16C are cross-sectional views along an optical axis showing an optical arrangement at the time of focusing to a first object, of a zoom lens according to an example 8.
Figure 16B:
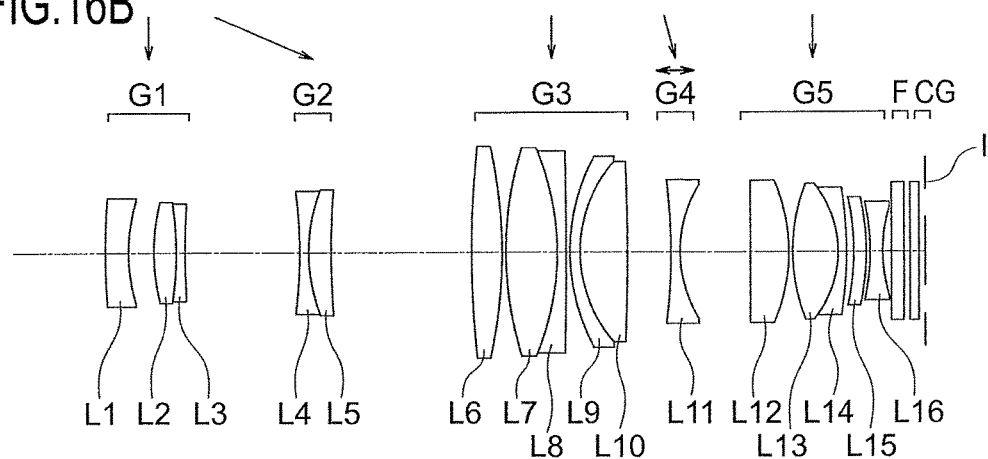
Figure 16C:
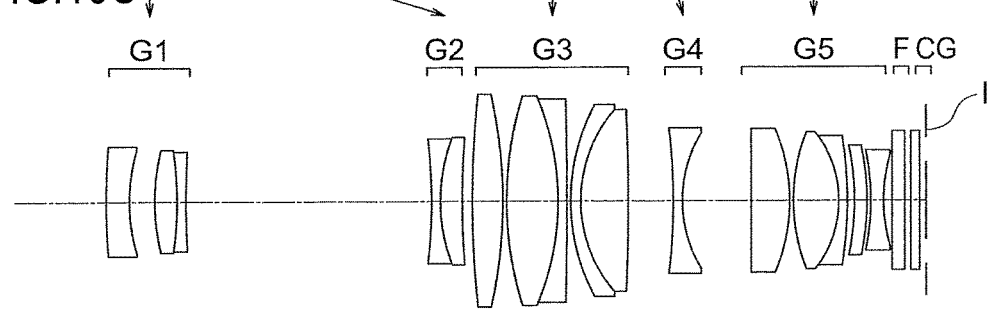
Figure 18A:
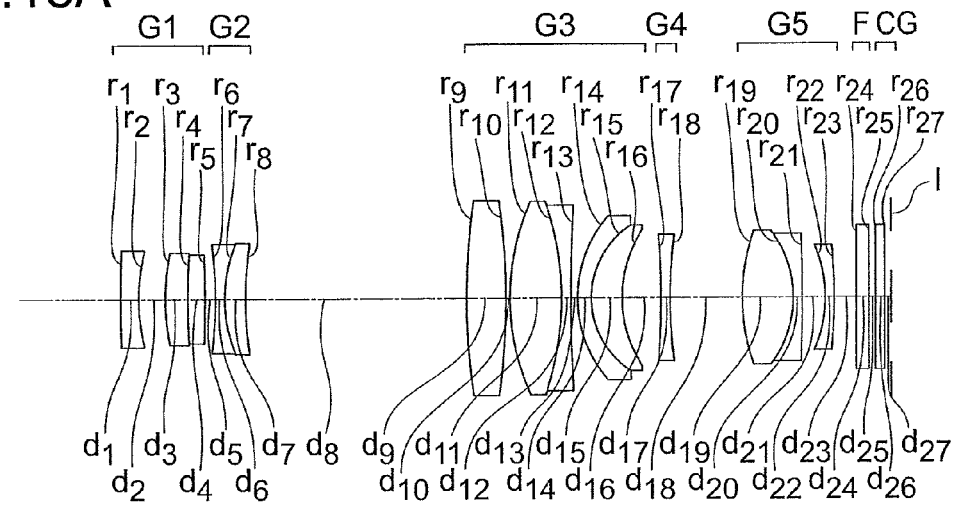
FIG. 18A, FIG. 18S, and FIG. 18O are cross-sectional views along an optical axis showing an optical arrangement at the time of focusing to a first object, of a zoom lens according to an example 9.
Figure 18B:
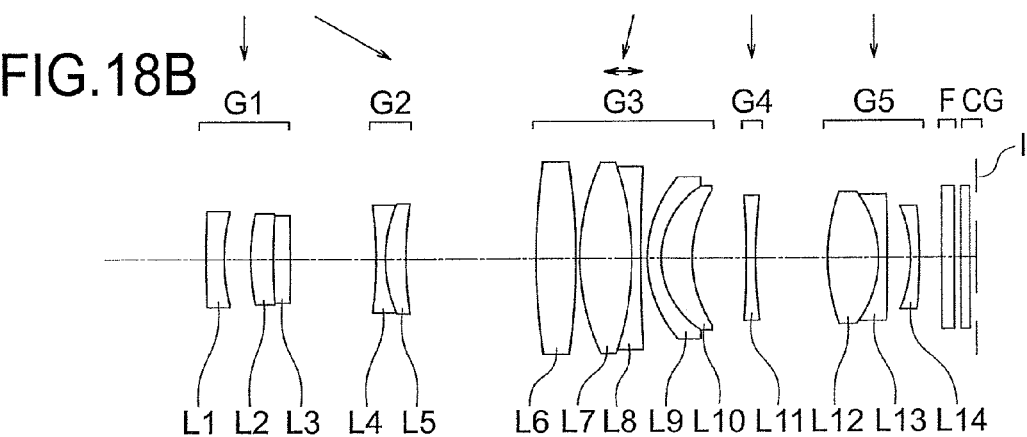
Figure 18C:
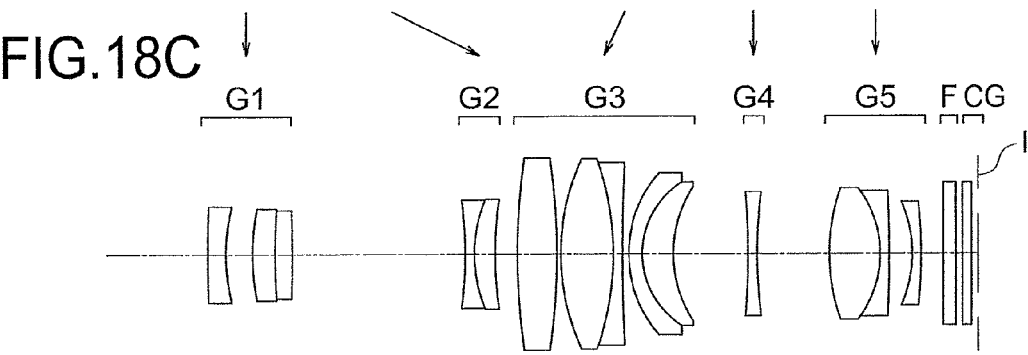
Figures 19A, 19B, 19C, 19D:
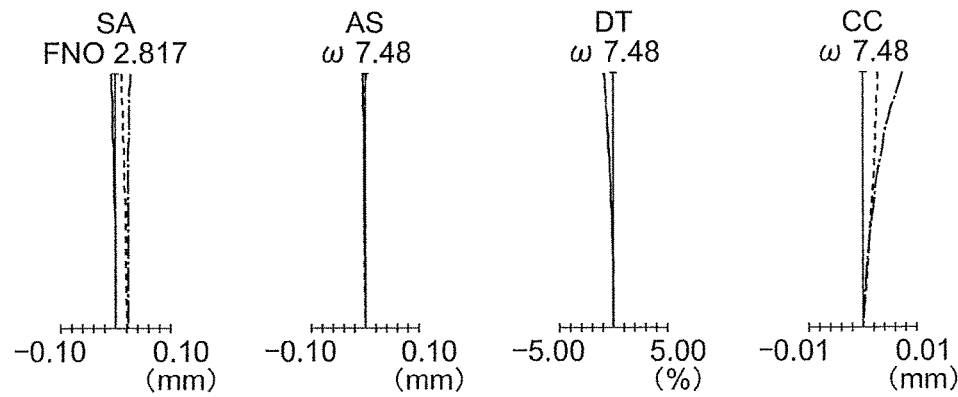
FIG. 19A, FIG. 19B, FIG. 19C, FIG. 19D, FIG. 19E, FIG. 19F, FIG. 19G, FIG. 19H, FIG. 19I, FIG. 19J, FIG. 19K, and FIG. 19L are aberration diagrams at the time of focusing to the first object of the zoom lens according to the example 9.
Figures 19E, 19F, 19G, 19H:
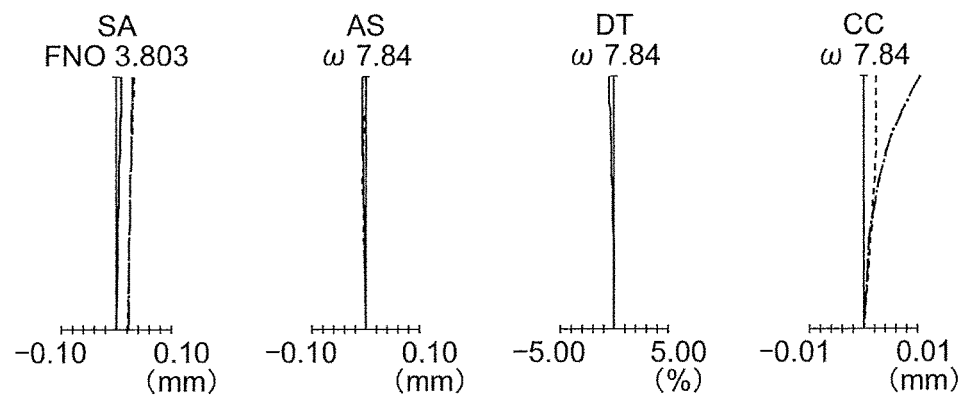
Figures 19I, 19J, 19K, 19L:
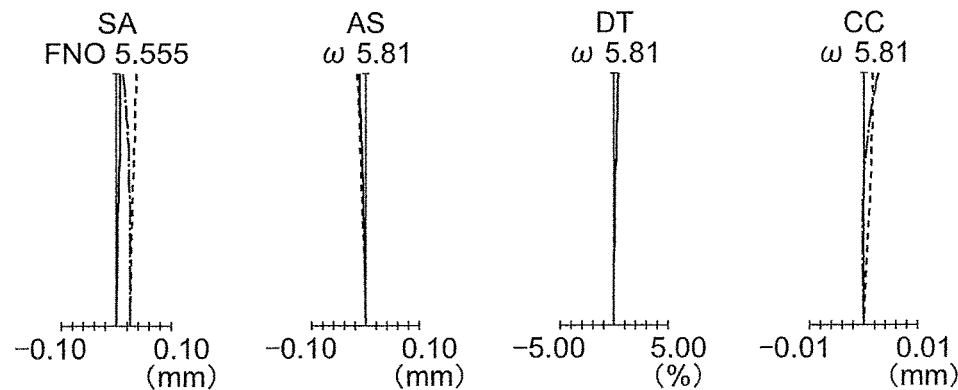

Conditional expression (13) is a conditional expression related to an amount of variation. $y_{w7d}$ and $y_{w7d}'$ in conditional expression (13) will be described by using FIG. 1A and FIG. 1B. FIG. 1A shows an overall zoom lens and FIG. 1B is an enlarged view showing proximity of an image plane. Moreover, $L_{w7}$ shows a predetermined light ray, LA shows a lens nearest to object of the zoom lens, and Fo indicates the focusing lens unit.

FIG. 1A and FIG. 1B are diagrams showing how the image height varies according to a movement of the focusing lens unit Fo. In FIG. 1A and FIG. 1B, P1 is a position of the focusing lens unit Fo when focused to a first object. Moreover, P2 is a position to which the focusing lens unit Fo is moved only by a minute amount ΔS. For making the movement of the focusing lens unit Fo easily understandable, the movement of the focusing lens unit Fo is exaggeratedly illustrated in FIG. 1B.

The predetermined light ray $L_{w7}$ is a light ray with an angle of view of 7 degrees at the wide angle end. The predetermined light ray $L_{w7}$ passes through a center of a lens surface on the object side of the lens LA.

In a state of a position of the focusing lens unit Fo coinciding with P1, a light ray incident on the focusing lens unit Fo advances as shown by a solid line, and reaches an image position. The image height at this time becomes $y_{w7d}$. From this state, the focusing lens unit Fo is let to undergo a wobbling operation. Accordingly, the focusing lens unit Fo moves to a position of P2.

In a state of the position of the focusing lens unit Fo coinciding with P2, a light ray incident on the focusing lens unit Fo advances as shown by a broken line, and reaches an image position. The image height at this time becomes $y_{w7d}'$. As shown in FIG. 1B, for the light ray of the angle of view of 7 degrees at the wide angle end, the image height fluctuates between $y_{w7d}$ and $y_{w7d}'$ according to the position of the focusing lens unit Fo.

In autofocusing, a focused state is maintained all the time by letting the focusing lens unit Fo undergo the wobbling operation. Therefore, in autofocusing, the amount of variation of the image height is sought to be small at the time of movement of the focusing lens unit Fo.

Conditional expression (13) indicates as to how much the variation in the image height is prominent on the image pickup element when the focusing lens unit has fluctuated minutely. Since the amount of variation in the image height is divided by the pixel pitch, finer the pixel pitch, more prominent is the variation in the image height. Moreover, when a sensor size is same, larger the total number of pixels, finer is the pixel pitch. Therefore, conditional expression (13) reflects the fact that larger the number of pixels, more prominent is the variation in the image height.

By satisfying conditional expression (13), it is possible to suppress an increase in the amount of variation of the image height (y direction) at the time of focusing. Accordingly, even at the time of observing an endoscope image on a television monitor upon enlarging for example, it is possible to use the endoscope without an uncomfortable feeling.

It is preferable that the following conditional expression (13') be satisfied instead of conditional expression (13).

$$|(y_{w7d'}-y_{w7d})/P|/(1/N)<200 \qquad (13')$$

Furthermore, it is more preferable that the following conditional expression (13") be satisfied instead of conditional expression (13).

$$|(y_{w7d'}-y_{w7d})/P|/(1/N)<150 \qquad (13")$$

Examples of zoom lenses to be used in the zoom image pickup apparatus according to the present invention will be described below in detail by referring to the accompanying diagrams. However, the present invention is not restricted to the examples described below. Moreover, as to whether the refractive power is positive or negative depends on a paraxial radius of curvature.

Moreover, a zoom lens in each of the following examples is to be connected to an eyepiece portion. Generally, since an aperture stop is disposed on an optical system of an optical instrument side, the aperture stop is not to be provided to the zoom lens side. However, for designing a zoom lens, an aperture stop is necessary. A virtual stop in the following description of examples is an aperture stop provided for designing. Therefore, in the actual zoom lens, the aperture stop does not exist physically. However, sometimes a stop (such as a flare aperture) for shielding unnecessary light rays is disposed at a position of the virtual stop.

Moreover, a position of a first object is a position when an object-point distance is 1000 mm. Furthermore, a position of a second object is a position when the object-point distance is 333.33 mm, and at the position of the second object, object is nearest to the zoom lens.

Cross-sectional views of each example will be described below. Cross-sectional views are lens cross-sectional views along an optical axis showing an optical arrangement when focused to the first object. In the cross-sectional views, F indicates a filter, CG indicates a cover glass, and I indicates an image pickup surface (image plane) of an image pickup element. For instance, in a case of a type using three image pickup elements (three-plate type), CG indicates a color separation prism and not a cover glass.

FIG. 2A, FIG. 4A, FIG. 6A, FIG. 8A, FIG. 10A, FIG. 12A, FIG. 14A, FIG. 16A, and FIG. 18A show cross-sectional views at a wide angle end;

FIG. 2B, FIG. 4B, FIG. 6B, FIG. 8B, FIG. 10B, FIG. 12B, FIG. 14B, FIG. 16B, and FIG. 18B show cross-sectional views in an intermediate focal length state.

FIG. 2C, FIG. 4C, FIG. 6C, FIG. 8C, FIG. 10C, FIG. 12C, FIG. 14C, FIG. 16C, and FIG. 18C show cross-sectional views at a telephoto end.

Aberration diagrams for each example will be described below. Aberration diagrams are aberration diagrams at the time of focusing to a first object.

FIG. 3A, FIG. 5A, FIG. 7A, FIG. 9A, FIG. 11A, FIG. 13A, FIG. 15A, FIG. 17A, and FIG. 19A show a spherical aberration (SA) at the wide angle end.

FIG. 3B, FIG. 5B, FIG. 7B, FIG. 9B, FIG. 11B, FIG. 13B, FIG. 15B, FIG. 17B, and FIG. 19B show an astigmatism (AS) at the wide angle end.

FIG. 3C, FIG. 5C, FIG. 7C, FIG. 9C, FIG. 11C, FIG. 13C, FIG. 15C, FIG. 17C, and FIG. 19C show a distortion (DT) at the wide angle end.

FIG. 3D, FIG. 5D, FIG. 7D, FIG. 9D, FIG. 11D, FIG. 13D, FIG. 15D, FIG. 17D, and FIG. 19D show a chromatic aberration of magnification (CC) at the wide angle end.

FIG. 3E, FIG. 5E, FIG. 7E, FIG. 9E, FIG. 11E, FIG. 13E, FIG. 15E, FIG. 17E, and FIG. 19E show a spherical aberration (SA) in the intermediate focal length state.

FIG. 3F, FIG. 5F, FIG. 7F, FIG. 9F, FIG. 11F, FIG. 13F, FIG. 15F, FIG. 17F, and FIG. 19F show an astigmatism (AS) in the intermediate focal length state.

FIG. 3G, FIG. 5G, FIG. 7G, FIG. 9G, FIG. 11G, FIG. 13G, FIG. 15G, FIG. 17G, and FIG. 19G show a distortion (DT) in the intermediate focal length state.

FIG. 3H, FIG. 5H, FIG. 7H, FIG. 9H, FIG. 11H, FIG. 13H, FIG. 15H, FIG. 17H, and FIG. 19H show a chromatic aberration of magnification (CC) in the intermediate focal length state.

FIG. 3I, FIG. 5I, FIG. 7I, FIG. 9I, FIG. 11I, FIG. 13I, FIG. 15I, FIG. 17I, and FIG. 19I show a spherical aberration (SA) at the telephoto end.

FIG. 3J, FIG. 5J, FIG. 7J, FIG. 9J, FIG. 11J, FIG. 13J, FIG. 15J, FIG. 17J, and FIG. 19J show an astigmatism (AS) at the telephoto end.

FIG. 3K, FIG. 5K, FIG. 7K, FIG. 9K, FIG. 11K, FIG. 13K, FIG. 15K, FIG. 17K, and FIG. 19K show a distortion (DT) at the telephoto end.

FIG. 3L, FIG. 5L, FIG. 7L, FIG. 9L, FIG. 11L, FIG. 13L, FIG. 15L, FIG. 17L, and FIG. 19L show a chromatic aberration of magnification (CC) at the telephoto end.

A zoom lens according to an example 1 will be described below.

A zoom lens according to the example 1 includes in order from an object side, a first lens unit G1 having a positive refractive power, a second lens unit G2 having a negative refractive power, a third lens unit G3 having a positive refractive power, a fourth lens unit G4 having a negative refractive power, and a fifth lens unit G5 having a positive refractive power.

The first lens unit G1 includes a negative meniscus lens L1 having a convex surface directed toward an image side, a biconvex positive lens L2, and a negative meniscus lens L3 having a convex surface directed toward the image side. Here, the biconvex positive lens L2 and the negative meniscus lens L3 are cemented. A virtual stop is set to be positioned on an image-side surface of the negative meniscus lens L3.

The second lens unit G2 includes a positive meniscus lens L4 having a convex surface directed toward the image side and a biconcave negative lens L5. Here, the positive meniscus lens L4 and the biconcave negative lens L5 are cemented.

The third lens unit G3 includes a biconvex positive lens L6, a biconvex positive lens L7, and a biconcave negative lens L8. Here, the biconvex positive lens L7 and the biconcave negative lens L8 are cemented.

The fourth lens unit G4 includes a biconcave negative lens L9.

The fifth lens unit G5 includes a biconvex positive lens L10 and a negative meniscus lens L11 having a convex surface directed toward the image side. Here, the biconvex positive lens L10 and the negative meniscus lens L11 are cemented.

At the time of zooming from a wide angle end to a telephoto end, the first lens unit G1 is fixed, the second lens unit G2 moves toward the image side, the third lens unit G3 is fixed, the fourth lens unit G4 moves toward the image side, and fifth lens unit G5 is fixed.

Moreover, focusing to an object is carried out by a movement of the fourth lens unit G4. At the time of focusing from a first object to a second object, the biconcave negative lens L9 moves toward the image side.

Next, a zoom lens according to an example 2 will be described below.

The zoom lens according to the example 2 includes in order from an object side, a first lens unit G1 having a positive refractive power, a second lens unit G2 having a negative refractive power, a third lens unit G3 having a positive refractive power, a fourth lens unit G4 having a negative refractive power, and a fifth lens unit G5 having a positive refractive power.

The first lens unit G1 includes a negative meniscus lens L1 having a convex surface directed toward an image side, a biconvex positive lens L2, and a biconcave negative lens L3. Here, the biconvex positive lens L2 and the biconcave negative lens L3 are cemented. A virtual stop is set to be positioned on an image-side surface of the biconcave negative lens L3.

The second lens unit G2 includes a biconcave negative lens L4 and a positive meniscus lens L5 having a convex surface directed toward the object side. Here, the biconcave negative lens L4 and the positive meniscus lens L5 are cemented.

The third lens unit G3 includes a positive meniscus lens L6 having a convex surface directed toward the image side, a biconvex positive lens L7, a negative meniscus lens L8 having a convex surface directed toward the image side, a negative meniscus lens L9 having a convex surface directed toward the object side, and a positive meniscus lens L10 having a convex surface directed toward the object side. Here, the biconvex positive lens L7 and the negative meniscus lens L8 are cemented. Moreover, the negative meniscus lens L9 and the positive meniscus lens L10 are cemented.

The fourth lens unit G4 includes a negative meniscus lens L11 having a convex surface directed toward the image side and a biconcave negative lens L12. Here, the negative meniscus lens L11 and the biconcave negative lens L12 are cemented.

The fifth lens unit G5 includes a biconvex positive lens L13 and a biconcave negative lens L14.

At the time of zooming from a wide angle end to a telephoto end, the first lens unit G1 is fixed, the second lens unit G2 moves toward the image side, the third lens unit G3 is fixed, the fourth lens unit G4 moves toward the image side, and the fifth lens unit G5 is fixed.

Moreover, focusing to an object is carried out by a movement of the fourth lens unit G4. At the time of focusing from a first object to a second object, the negative meniscus lens L11 and the biconcave negative lens L12 move toward the image side.

Next, a zoom lens according to an example 3 will be described below.

The zoom lens according to the example 3 includes in order from an object side, a first lens unit G1 having a positive refractive power, a second lens unit G2 having a negative refractive power, a third lens unit G3 having a positive refractive power, a fourth lens unit G4 having a negative refractive power, and a fifth lens unit G5 having a positive refractive power.

The first lens unit G1 includes a negative meniscus lens L1 having a convex surface directed toward the object side, a biconvex positive lens L2, and a biconcave negative lens L3. Here, the biconvex positive lens L2 and the biconcave negative lens L3 are cemented. A virtual stop is set to be positioned on an image-side surface of the biconcave negative lens L3.

The second lens unit G2 includes a biconcave negative lens L4 and a positive meniscus lens L5 having a convex surface directed toward the object side. Here, the biconcave negative lens L4 and the positive meniscus lens L5 are cemented.

The third lens unit G3 includes a biconvex positive lens L6, a biconvex positive lens L7, a biconcave negative lens L8, a negative meniscus lens L9 having a convex surface directed toward the object side, and a biconvex positive lens L10. Here, the biconvex positive lens L7 and the biconcave negative lens L8 are cemented. Moreover, the negative meniscus lens L9 and the biconvex positive lens L10 are cemented.

The fourth lens unit G4 includes a biconcave negative lens L11.

The fifth lens unit G5 includes a biconvex positive lens L12, a biconvex positive lens L13, a negative meniscus lens L14 having a convex surface directed toward an image side, a positive meniscus lens L15 having a convex surface directed toward the image side, and a biconcave negative lens L16. Here, the biconvex positive lens L13 and the negative meniscus lens L14 are cemented.

At the time of zooming from a wide angle end to a telephoto end, the first lens unit G1 is fixed, the second lens unit G2 moves toward the image side, the third lens unit G3 is fixed, the fourth lens unit G4 moves toward the image side, and the fifth lens unit G5 is fixed. A position of the fourth lens unit G4 is same in an intermediate focal length state and at the telephoto end.

Moreover, focusing to an object is carried out by a movement of the fourth lens unit G4. At the time of focusing from a first object to a second object, the biconcave negative lens L11 moves toward the image side.

Next, a zoom lens according to an example 4 will be described below.

The zoom lens according to the example 4 includes in order from an object side, a first lens unit G1 having a positive refractive power, a second lens unit G2 having a negative refractive power, a third lens unit G3 having a positive refractive power, a fourth lens unit G4 having a negative refractive power, and a fifth lens unit G5 having a positive refractive power.

The first lens unit G1 includes a biconvex positive lens L1 and a biconcave negative lens L2. Here, the biconvex positive lens L1 and the biconcave negative lens L2 are cemented. A virtual stop is set to be positioned on an image-side surface of the biconcave negative lens L2.

The second lens unit G2 includes a biconcave negative lens L3 and a positive meniscus lens L4 having a convex surface directed toward the object side. Here, the biconcave negative lens L3 and the positive meniscus lens L4 are cemented.

The third lens unit G3 includes a biconvex positive lens L5, a negative meniscus lens L6 having a convex surface directed toward the object side, and a biconvex positive lens L7. Here, the negative meniscus lens L6 and the biconvex positive lens L7 are cemented.

The fourth lens unit G4 includes a negative meniscus lens L8 having a convex surface directed toward the object side.

The fifth lens unit G5 includes a biconvex positive lens L9, a biconvex positive lens L10, and a biconcave negative lens L11. Here, the biconvex positive lens L10 and the biconcave negative lens L11 are cemented.

At the time of zooming from a wide angle end to a telephoto end, the first lens unit G1 is fixed, the second lens unit G2 moves toward an image side, the third lens unit G3 is fixed, the fourth lens unit G4 moves toward the image side, and the fifth lens unit G5 is fixed.

Moreover, focusing to an object is carried out by a movement of the fourth lens unit G4. At the time of focusing from a first object to a second object, the negative meniscus lens L8 moves toward the image side.

An aspheric surface is provided to two surfaces namely, both surfaces of the biconvex positive lens L5.

Next, a zoom lens according to an example 5 will be described below.

The zoom lens according to the example 5 includes in order from an object side, a first lens unit G1 having a positive refractive power, a second lens unit G2 having a negative refractive power, a third lens unit G3 having a positive refractive power, a fourth lens unit G4 having a negative refractive power, and a fifth lens unit G5 having a positive refractive power.

The first lens unit G1 includes a negative meniscus lens L1 having a convex surface directed toward an image side, a biconvex positive lens L2, and a negative meniscus lens L3 having a convex surface directed toward the image side. Here, the biconvex positive lens L2 and the negative meniscus lens L3 are cemented. A virtual stop is set to be positioned on an image-side surface of the negative meniscus lens L3.

The second lens unit G2 includes a biconcave negative lens L4 and a positive meniscus lens L5 having a convex surface directed toward the object side. Here, the biconcave negative lens L4 and the positive meniscus lens L5 are cemented.

The third lens unit G3 includes a positive meniscus lens L6 having a convex surface directed toward the image side, a biconvex positive lens L7, a negative meniscus lens L8 having a convex surface directed toward the image side, a negative meniscus lens L9 having a convex surface directed toward the object side, and a biconvex positive lens L10. Here, the biconvex positive lens L7 and the negative meniscus lens L8 are cemented. Moreover, the negative meniscus lens L9 and the biconvex positive lens L10 are cemented.

The fourth lens unit G4 includes a negative meniscus lens L11 having a convex surface directed toward the image side and a biconcave negative lens L12.

The fifth lens unit G5 includes a biconvex positive lens L13 and a negative meniscus lens L14 having a convex surface directed toward the image side.

At the time of zooming from a wide angle end to a telephoto end, the first lens unit G1 is fixed, the second lens unit G2 moves toward the image side, the third lens unit G3 is fixed, the fourth lens unit G4 moves toward the image side, and the fifth lens unit G5 is fixed.

Moreover, focusing to an object is carried out by a movement of the fourth lens unit G4. At the time of focusing from a first object to a second object, the negative meniscus lens L11 and the biconcave negative lens L12 move toward the image side.

Next, a zoom lens according to an example 6 will be described below.

The zoom lens according to the example 6 includes in order from an object side, a first lens unit G1 having a positive refractive power, a second lens unit G2 having a negative refractive power, a third lens unit G3 having a positive refractive power, a fourth lens unit G4 having a negative refractive power, and a fifth lens unit G5 having a positive refractive power.

The first lens unit G1 includes a negative meniscus lens L1 having a convex surface directed toward the object side, a biconvex positive lens L2, and a biconcave negative lens L3. Here, the biconvex positive lens L2 and the biconcave negative lens L3 are cemented. A virtual stop is set to be positioned on an image-side surface of the biconcave negative lens L3.

The second lens unit G2 includes a biconcave negative lens L4 and a positive meniscus lens L5 having a convex surface directed toward the object side. Here, the biconcave negative lens L4 and the positive meniscus lens L5 are cemented.

The third lens unit G3 includes a biconvex positive lens L6, a biconvex positive lens L7, a negative meniscus lens L8 having a convex surface directed toward an image side, a negative meniscus lens L9 having a convex surface directed toward the object side, and a positive meniscus lens L10 having a convex surface directed toward the object side. Here, the biconvex positive lens L7 and the negative meniscus lens L8 are cemented. Moreover, the negative meniscus lens L9 and the positive meniscus lens L10 are cemented.

The fourth lens unit G4 includes a biconcave negative lens L11.

The fifth lens unit G5 includes a biconvex positive lens L12, a biconvex positive lens L13, a negative meniscus lens L14 having a convex surface directed toward the image side, a negative meniscus lens L15 having a convex surface directed toward the image side, and a negative meniscus lens L16 having a convex surface directed toward the object side.

At the time of zooming from a wide angle end to a telephoto end, the first lens unit G1 is fixed, the second lens unit G2 moves toward the image side, the third lens unit G3 is fixed, the fourth lens unit G4 moves toward the image side, and the fifth lens unit G5 is fixed.

Moreover, focusing to an object is carried out by a movement of the fourth lens unit G4. At the time of focusing from a first object to a second object, the biconcave negative lens L11 moves toward the image side.

Next, a zoom lens according to an example 7 will be described below.

The zoom lens according to the example 7 includes in order from an object side, a first lens unit G1 having a positive refractive power, a second lens unit G2 having a negative refractive power, a third lens unit G3 having a positive refractive power, a fourth lens unit G4 having a negative refractive power, and a fifth lens unit G5 having a positive refractive power.

The first lens unit G1 includes a negative meniscus lens L1 having a convex surface directed toward an image side, a biconvex positive lens L2, and a negative meniscus lens L3 having a convex surface directed toward the image side. Here, the biconvex positive lens L2 and the negative meniscus lens L3 are cemented. A virtual stop is set to be positioned on an image-side surface of the negative meniscus lens L3.

The second lens unit G2 includes a positive meniscus lens L4 having a convex surface directed toward the image side and a biconcave negative lens L5. Here, the positive meniscus lens L4 and the biconcave negative lens L5 are cemented.

The third lens unit G3 includes a biconvex positive lens L6, a biconvex positive lens L7, and a biconcave negative lens L8. Here, the biconvex positive lens L7 and the biconcave negative lens L8 are cemented.

The fourth lens unit G4 includes a biconcave negative lens L9.

The fifth lens unit G5 includes a biconvex positive lens L10 and a negative meniscus lens L11 having a convex surface directed toward the image side. Here, the biconvex positive lens L10 and the negative meniscus lens L11 are cemented.

At the time of zooming from a wide angle end to a telephoto end, the first lens unit G1 is fixed, the second lens unit G2 moves toward the image side, the third lens unit G3 is fixed, the fourth lens unit G4 moves toward the image side, and the fifth lens unit G5 is fixed.

Moreover, focusing to an object is carried out by a movement of the fourth lens unit G4. At the time of focusing from a first object to a second object, the biconcave negative lens L9 moves toward the image side.

Next, a zoom lens according to an example 8 will be described below.

The zoom lens according to the example 8 includes in order from an object side, a first lens unit G1 having a positive refractive power, a second lens unit G2 having a negative refractive power, a third lens unit G3 having a positive refractive power, a fourth lens unit G4 having a negative refractive power, and a fifth lens unit G5 having a positive refractive power.

The first lens unit G1 includes a negative meniscus lens L1 having a convex surface directed toward the object side, a biconvex positive lens L2, and a biconcave negative lens L3. Here, the biconvex positive lens L2 and the biconcave negative lens L3 are cemented. A virtual stop is set to be positioned on an image-side surface of the biconcave negative lens L3.

The second lens unit G2 includes a biconcave negative lens L4 and a positive meniscus lens L5 having a convex surface directed toward the object side. Here, the biconcave negative lens L4 and the positive meniscus lens L5 are cemented.

The third lens unit G3 includes a biconvex positive lens L6, a biconvex positive lens L7, a negative meniscus lens L8 having a convex surface directed toward an image side, a negative meniscus lens L9 having a convex surface directed toward the object side, and a biconvex positive lens L10. Here, the biconvex positive lens L7 and the negative meniscus lens L8 are cemented. Moreover, the negative meniscus lens L9 and the biconvex positive lens L10 are cemented.

The fourth lens unit G4 includes a biconcave negative lens L11.

The fifth lens unit G5 includes a biconvex positive lens L12, a biconvex positive lens L13, a negative meniscus lens L14 having a convex surface directed toward the image side, a positive meniscus lens L15 having a convex surface directed toward the image side, and a biconcave negative lens L16.

At the time of zooming from a wide angle end to a telephoto end, the first lens unit G1 is fixed, the second lens unit G2 moves toward the image side, the third lens unit G3 is fixed, the fourth lens unit G4 moves toward the image side, and the fifth lens unit G5 is fixed.

Moreover, focusing to an object is carried out by a movement of the fourth lens unit G4. At the time of focusing forma first object to a second object, the biconcave negative lens L11 moves toward the image side.

Next, a zoom lens according to an example 9 will be described below.

The zoom lens according to the example 9 includes in order from an object side, a first lens unit G1 having a positive refractive power, a second lens unit G2 having a negative refractive power, a third lens unit G3 having a positive refractive power, a fourth lens unit G4 having a negative refractive power, and a fifth lens unit G5 having a positive refractive power.

The first lens unit G1 includes a negative meniscus lens L1 having a convex surface directed toward the object side, a positive meniscus lens L2 having a convex surface directed toward the object side, and a biconvex positive lens L3. Here, the positive meniscus lens L2 and the biconvex positive lens L3 are cemented. A virtual stop is set to be positioned on an image-side surface of the biconvex positive lens L3.

The second lens unit G2 includes a biconcave negative lens L4 and a positive meniscus lens L5 having a convex surface directed toward the object side. Here, the biconcave negative lens L4 and the positive meniscus lens L5 are cemented.

The third lens unit G3 includes a biconvex positive lens L6, a biconvex positive lens L7, a biconcave negative lens L8, a negative meniscus lens L9 having a convex surface directed toward the object side, and a positive meniscus lens L10 having a convex surface directed toward the object side. Here, the biconvex positive lens L7 and the biconcave negative lens L8 are cemented. Moreover, the negative meniscus lens L9 and the positive meniscus lens L10 are cemented.

The fourth lens unit G4 includes a biconcave negative lens L11.

The fifth lens unit G5 includes a biconvex positive lens L12, a negative meniscus lens L13 having a convex surface directed toward an image side, and a negative meniscus lens L14 having a convex surface directed toward the image side. Here, the biconvex positive lens L12 and the negative meniscus lens L13 are cemented.

At the time of zooming from a wide angle end to a telephoto end, the first lens unit G1 is fixed, the second lens unit G2 moves toward the image side, the third lens unit G3 moves toward the object side, the fourth lens unit G4 is fixed, and the fixed lens unit G5 is fixed.

Moreover, focusing to an object is carried out by a movement of the fourth lens unit G4. At the time of focusing from a first object to a second object, the biconcave negative lens L11 moves toward the image side.

Next, numerical data of optical components comprising the zoom lens of each above example are shown. In numerical data of each example, r1, r2, . . . denotes a curvature radius of each lens surface, d1, d2, . . . denotes a thickness of each lens or an air distance between adjacent lens surfaces, nd1, nd2, . . . denotes a refractive index of each lens for d-line, v1, vd2, . . . denotes an Abbe number of each lens, ER denotes an effective diameter, * denotes an aspheric surface. Moreover, in zoom data, f denotes a focal length of an overall zoom lens system, FNO. denotes F-number, FE denotes a back focus, IH denotes an image height, ω denotes a half angle of field, f1, f2 . . . is a focal length of each lens unit. Further, Lens total length is the distance from the frontmost lens surface to the rearmost lens surface plus the back focus. The back focus is a unit which is expressed upon air conversion of a distance from the lens backmost surface to a paraxial image surface.

Moreover, WE1, ST1 and TE1 denote a wide angle end, an intermediate state and a telephoto end, respectively, at a state of focusing to the first object. WE2, ST2 and TE2 denote a wide angle end, an intermediate state and a telephoto end, respectively, at a state of focusing to the second object. Further, a value of IH and a value of w do not denote a value at focal length in each state.

Moreover, a shape of an aspheric surface is defined by the following expression where the direction of the optical axis is represented by z, the direction orthogonal to the optical axis is represented by y, a conical coefficient is represented by K, aspheric surface coefficients are represented by A4, A6, A8, A10

$$Z=(y^2/r)/[1+\{1-(1+k)(y/r)^2\}^{1/2}]+A4y^4+A6y^6+A8y^8+A10y^{10}$$

Further, in the aspherical surface coefficients, 'e-n' (where, n is an integral number) indicates '$10^{-n}$'. Moreover, these symbols are commonly used in the following numerical data for each example.

Example 1

| Unit mm | | | | | |
|---|---|---|---|---|---|
| Surface data | | | | | |
| Surface no. | r | d | nd | vd | ER |
| Object plane | ∞ | ∞ | | | |
| 1 | −12.214 | 2.70 | 1.58144 | 40.75 | 2.1728 |
| 2 | −20.622 | 0.30 | | | 2.1487 |
| 3 | 38.082 | 1.80 | 1.48749 | 70.23 | 2.1132 |
| 4 | −8.106 | 0.70 | 1.78590 | 44.20 | 2.0107 |
| 5 | −12.145 | Variable | | | |
| 6 | −15.671 | 1.42 | 1.92286 | 18.90 | 2.0982 |
| 7 | −7.610 | 0.70 | 1.74951 | 35.33 | 2.2171 |
| 8 | 25.752 | Variable | | | 2.3026 |
| 9 | 258.336 | 1.75 | 1.75500 | 52.32 | 4.802 |
| 10 | −19.896 | 0.30 | | | 4.9185 |
| 11 | 15.793 | 3.00 | 1.72916 | 54.68 | 4.9117 |
| 12 | −20.119 | 1.20 | 1.80518 | 25.42 | 4.6805 |
| 13 | 130.235 | Variable | | | 4.4587 |
| 14 | −32.675 | 0.70 | 1.72916 | 54.68 | 3.83 |
| 15 | 18.164 | Variable | | | 3.7522 |
| 16 | 28.066 | 3.00 | 1.88300 | 40.76 | 3.9661 |
| 17 | −10.669 | 0.70 | 1.78472 | 25.68 | 3.8877 |
| 18 | −151.242 | Variable | | | 3.8001 |
| 19 | ∞ | 1.00 | 1.52113 | 66.54 | |
| 20 | ∞ | 0.50 | | | |
| 21 | ∞ | 14.90 | 1.51633 | 64.14 | |
| 22 | ∞ | 0.70 | | | |
| Image plane | ∞ | | | | |

| Zoom data | | | | | | |
|---|---|---|---|---|---|---|
| Zoom ratio 1.97 | | | | | | |
| | WE1 | ST1 | TE1 | WE2 | ST2 | TE2 |
| f | 15.83 | 21.69 | 31.22 | 15.74 | 21.41 | 30.24 |
| FNO. | 4.41 | 6.04 | 8.69 | 4.38 | 5.96 | 8.42 |
| FB | 19.44 | 19.44 | 19.44 | 19.44 | 19.44 | 19.44 |
| LTL | 59.28 | 59.28 | 59.28 | 59.28 | 59.28 | 59.28 |
| d5 | 1.60 | 6.49 | 12.20 | 1.60 | 6.49 | 12.20 |
| d8 | 12.23 | 7.34 | 1.62 | 12.23 | 7.34 | 1.62 |
| d13 | 3.55 | 4.17 | 4.22 | 3.82 | 4.70 | 5.36 |
| d15 | 4.20 | 3.57 | 3.52 | 3.92 | 3.04 | 2.38 |
| d18 | 2.34 | 2.34 | 2.34 | 2.34 | 2.34 | 2.34 |
| IH | 1.92 | 2.73 | 3.00 | 1.92 | 2.73 | 3.00 |
| ω | 7.03 | 7.28 | 5.46 | 7.1 | 7.36 | 5.46 |

| Unit focal length | | | | |
|---|---|---|---|---|
| f1 = 35.30 | f2 = −15.16 | f3 = 12.75 | f4 = −15.85 | f5 = 22.17 |

Example 2

| Unit mm | | | | | |
|---|---|---|---|---|---|
| Surface data | | | | | |
| Surface no. | r | d | nd | vd | ER |
| Object plane | ∞ | ∞ | | | |
| 1 | −15.012 | 0.70 | 1.88300 | 40.76 | 3.5678 |
| 2 | −16.475 | 0.50 | | | 3.6075 |
| 3 | 52.044 | 1.70 | 1.80610 | 40.92 | 3.5081 |
| 4 | −16.001 | 0.70 | 1.72151 | 29.23 | 3.4058 |
| 5 | 4134.942 | Variable | | | 3.3334 |
| 6 | −35.115 | 0.70 | 1.80610 | 40.92 | 3.3334 |
| 7 | 10.106 | 1.87 | 1.84666 | 23.78 | 3.4484 |
| 8 | 35.596 | Variable | | | 3.5458 |
| 9 | −1832.152 | 2.27 | 1.80610 | 40.92 | 7.4671 |
| 10 | −28.959 | 0.50 | | | 7.6195 |
| 11 | 58.441 | 4.00 | 1.57135 | 52.95 | 7.6161 |
| 12 | −15.741 | 0.70 | 1.74077 | 27.79 | 7.5389 |
| 13 | −87.401 | 0.78 | | | 7.5633 |
| 14 | 12.676 | 0.80 | 1.69895 | 30.13 | 7.4011 |
| 15 | 9.422 | 4.41 | 1.49700 | 81.61 | 6.9479 |
| 16 | 199.193 | Variable | | | 6.6287 |
| 17 | −50.492 | 2.15 | 1.92286 | 18.90 | 5.9176 |
| 18 | −29.717 | 0.70 | 1.58144 | 40.75 | 5.7288 |
| 19 | 9.709 | Variable | | | 5.2644 |
| 20 | 14.909 | 4.00 | 1.72916 | 54.68 | 5.7444 |
| 21 | −24.171 | 5.94 | | | 5.4936 |
| 22 | −22.094 | 0.70 | 1.80518 | 25.42 | 2.8635 |
| 23 | 68.660 | Variable | | | 2.7234 |
| 24 | ∞ | 1.00 | 1.52113 | 66.54 | |
| 25 | ∞ | 0.50 | | | |
| 26 | ∞ | 0.70 | 1.51633 | 64.14 | |
| 27 | ∞ | 0.50 | | | |
| Image plane | ∞ | | | | |

| Zoom data | | | | | | |
|---|---|---|---|---|---|---|
| Zoom ratio 1.97 | | | | | | |
| | WE1 | ST1 | TE1 | WE2 | ST2 | TE2 |
| f | 16.30 | 22.01 | 32.14 | 16.10 | 21.43 | 29.95 |
| FNO. | 2.49 | 3.36 | 4.91 | 2.46 | 3.27 | 4.58 |
| FB | 4 | 4 | 4 | 4 | 4 | 4 |
| LTL | 63.50 | 63.50 | 63.50 | 63.50 | 63.50 | 63.50 |
| d5 | 0.68 | 8.00 | 17.19 | 0.68 | 8.00 | 17.19 |
| d8 | 18.22 | 10.89 | 1.71 | 18.22 | 10.89 | 1.71 |
| d16 | 2.70 | 3.33 | 3.70 | 3.09 | 4.06 | 5.35 |
| d19 | 4.78 | 4.15 | 3.78 | 4.39 | 3.43 | 2.13 |
| d23 | 1.30 | 1.30 | 1.30 | 1.30 | 1.30 | 1.30 |
| IH | 1.92 | 2.73 | 3.00 | 1.92 | 2.73 | 3.00 |
| ω | 6.83 | 7.17 | 5.25 | 6.95 | 7.35 | 5.33 |

| Unit focal length | | | | |
|---|---|---|---|---|
| f1 = 58.87 | f2 = −23.06 | f3 = 15.86 | f4 = −14.67 | f5 = 18.15 |

Example 3

| Unit mm | | | | | |
|---|---|---|---|---|---|
| Surface data | | | | | |
| Surface no. | r | d | nd | vd | ER |
| Object plane | ∞ | ∞ | | | |
| 1 | 50.195 | 0.70 | 1.57135 | 52.95 | 3.8202 |
| 2 | 14.605 | 1.84 | | | 3.7125 |
| 3 | 16.895 | 3.10 | 1.80400 | 46.57 | 3.6868 |
| 4 | −28.288 | 0.70 | 1.69895 | 30.13 | 3.4197 |
| 5 | 69.580 | Variable | | | |
| 6 | −41.811 | 0.70 | 1.88300 | 40.76 | 3.3333 |

-continued

Unit mm

| 7 | 13.843 | 1.76 | 1.84666 | 23.78 | 3.4287 |
| 8 | 58.330 | Variable | | | 3.5461 |
| 9 | 82.739 | 2.52 | 1.88300 | 40.76 | 7.6069 |
| 10 | −34.283 | 0.30 | | | 7.6897 |
| 11 | 32.941 | 3.78 | 1.69680 | 55.53 | 7.517 |
| 12 | −19.967 | 0.70 | 2.00330 | 28.27 | 7.2943 |
| 13 | 385.813 | 0.30 | | | 7.1693 |
| 14 | 13.921 | 0.70 | 1.72825 | 28.46 | 6.9624 |
| 15 | 10.726 | 3.77 | 1.48749 | 70.23 | 6.6331 |
| 16 | −412.981 | Variable | | | 6.3211 |
| 17 | −210.166 | 0.70 | 1.58913 | 61.14 | 5.2422 |
| 18 | 8.832 | Variable | | | 4.8053 |
| 19 | 14.758 | 3.40 | 1.49700 | 81.61 | 5.1012 |
| 20 | −20.808 | 0.30 | | | 4.9371 |
| 21 | 27.266 | 3.59 | 1.88300 | 40.76 | 4.5942 |
| 22 | −10.640 | 0.70 | 1.72916 | 54.68 | 4.0655 |
| 23 | −38.106 | 0.48 | | | 3.6802 |
| 24 | −20.137 | 1.00 | 1.72825 | 28.46 | 3.435 |
| 25 | −16.275 | 0.32 | | | 3.1938 |
| 26 | −14.358 | 1.00 | 1.72825 | 28.46 | 2.9512 |
| 27 | 11.916 | Variable | | | 2.5692 |
| 28 | ∞ | 1.00 | 1.52113 | 66.54 | |
| 29 | ∞ | 0.50 | | | |
| 30 | ∞ | 0.70 | 1.51633 | 64.14 | |
| 31 | ∞ | 0.50 | | | |
| Image plane | ∞ | | | | |

Zoom data
Zoom ratio 1.97

| | WE1 | ST1 | TE1 | WE2 | ST2 | TE2 |
|---|---|---|---|---|---|---|
| f | 15.79 | 21.32 | 31.14 | 15.56 | 20.69 | 28.96 |
| FNO. | 2.39 | 3.23 | 4.72 | 2.36 | 3.14 | 4.39 |
| FB | 3.44 | 3.44 | 3.44 | 3.44 | 3.44 | 3.44 |
| LTL | 65.00 | 65.00 | 65.00 | 65.00 | 65.00 | 65.00 |
| d5 | 0.68 | 8.84 | 19.15 | 0.68 | 8.84 | 19.15 |
| d8 | 19.27 | 11.11 | 0.80 | 19.27 | 11.11 | 0.80 |
| d16 | 3.13 | 3.53 | 3.53 | 3.49 | 4.20 | 5.03 |
| d18 | 6.12 | 5.72 | 5.72 | 5.76 | 5.06 | 4.22 |
| d27 | 0.74 | 0.74 | 0.74 | 0.74 | 0.74 | 0.74 |
| IH | 1.92 | 2.73 | 3.00 | 1.92 | 2.73 | 3.00 |
| ω | 7.04 | 7.41 | 5.45 | 7.21 | 7.65 | 5.59 |

Unit focal length f1 = 62.65   f2 = −25.80   f3 = 14.80   f4 = −14.31   f5 = 19.10

Example 4

Unit mm

Surface data

| Surface no. | r | d | nd | vd | ER |
|---|---|---|---|---|---|
| Object plane | ∞ | ∞ | | | |
| 1 | 30.662 | 2.72 | 1.80400 | 46.57 | 3.6956 |
| 2 | −22.684 | 0.70 | 1.80100 | 34.97 | 3.4261 |
| 3 | 64.717 | Variable | | | |
| 4 | −38.528 | 0.70 | 1.80610 | 40.92 | 3.3288 |
| 5 | 11.707 | 1.87 | 1.84666 | 23.78 | 3.4425 |
| 6 | 38.468 | Variable | | | 3.5547 |
| 7* | 15.786 | 3.87 | 1.58913 | 61.14 | 8.3436 |
| 8* | −78.080 | 0.30 | | | 8.1822 |
| 9 | 19.438 | 0.70 | 1.78472 | 25.68 | 7.9479 |
| 10 | 10.466 | 5.71 | 1.48749 | 70.23 | 7.4128 |
| 11 | −27.757 | Variable | | | 7.1991 |
| 12 | 34.286 | 0.70 | 1.69680 | 55.53 | 5.679 |
| 13 | 9.038 | Variable | | | 5.1727 |
| 14 | 13.594 | 2.88 | 1.77250 | 49.60 | 5.1601 |
| 15 | −34.478 | 0.30 | | | 4.8934 |
| 16 | 12.804 | 3.59 | 1.51633 | 64.14 | 4.2396 |
| 17 | −18.940 | 0.70 | 1.74951 | 35.33 | 3.1091 |
| 18 | 6.368 | Variable | | | 2.602 |
| 19 | ∞ | 1.00 | 1.52113 | 66.54 | |
| 20 | ∞ | 0.50 | | | |
| 21 | ∞ | 0.70 | 1.51633 | 64.14 | |
| 22 | ∞ | 0.50 | | | |
| Image plane | ∞ | | | | |

Aspherical surface data

7th surface k = 0.000
A4 = −9.21106e−06, A6 = 6.75309e−08, A8 = 1.55922e−09

8th surface k = 0.000
A4 = 7.46114e−05, A6 = 1.19205e−07, A8 = 1.16426e−09

Zoom data
Zoom ratio 1.97

| | WE1 | ST1 | TE1 | WE2 | ST2 | TE2 |
|---|---|---|---|---|---|---|
| f | 15.83 | 21.69 | 31.22 | 15.51 | 20.82 | 28.31 |
| FNO. | 2.28 | 3.13 | 4.50 | 2.24 | 3.00 | 4.08 |
| FB | 3.82 | 3.82 | 3.82 | 3.82 | 3.82 | 3.82 |
| LTL | 59.74 | 59.74 | 59.74 | 59.74 | 59.74 | 59.74 |
| d3 | 0.59 | 9.15 | 18.94 | 0.59 | 9.15 | 18.94 |
| d6 | 19.22 | 10.66 | 0.87 | 19.22 | 10.66 | 0.87 |
| d11 | 2.91 | 3.60 | 4.09 | 3.32 | 4.40 | 5.94 |
| d13 | 8.46 | 7.77 | 7.28 | 8.04 | 6.96 | 5.43 |
| d18 | 1.12 | 1.12 | 1.12 | 1.12 | 1.12 | 1.12 |
| IH | 1.92 | 2.73 | 3.00 | 1.92 | 2.73 | 3.00 |
| ω | 7.03 | 7.28 | 5.38 | 7.22 | 7.57 | 5.58 |

Unit focal length f1 = 68.55   f2 = −24.98   f3 = 14.86   f4 = −17.74   f5 = 26.57

Example 5

Unit mm

Surface data

| Surface no. | r | d | nd | vd | ER |
|---|---|---|---|---|---|
| Object plane | ∞ | ∞ | | | |
| 1 | −14.562 | 1.68 | 1.88300 | 40.76 | 3.2034 |
| 2 | −17.237 | 0.50 | | | 3.2719 |
| 3 | 66.245 | 1.65 | 1.80610 | 40.92 | 3.185 |
| 4 | −13.676 | 0.70 | 1.72151 | 29.23 | 3.093 |
| 5 | −165.866 | Variable | | | |
| 6 | −30.624 | 0.70 | 1.80610 | 40.92 | 3.0285 |
| 7 | 10.283 | 1.82 | 1.84666 | 23.78 | 3.1446 |
| 8 | 37.753 | Variable | | | 3.257 |
| 9 | −277.278 | 2.18 | 1.80610 | 40.92 | 7.1005 |
| 10 | −27.086 | 0.50 | | | 7.2694 |
| 11 | 61.882 | 2.90 | 1.57135 | 52.95 | 7.3011 |
| 12 | −23.873 | 0.70 | 1.74077 | 27.79 | 7.2573 |
| 13 | −76.315 | 0.50 | | | 7.2606 |
| 14 | 11.993 | 0.70 | 1.69895 | 30.13 | 7.0477 |
| 15 | 8.513 | 4.63 | 1.49700 | 81.61 | 6.5643 |
| 16 | −547.927 | Variable | | | 6.2284 |
| 17 | −28.802 | 1.69 | 1.80518 | 25.42 | 5.4826 |
| 18 | −42.509 | 0.30 | | | 5.3091 |
| 19 | −37.850 | 0.70 | 1.58144 | 40.75 | 5.2329 |
| 20 | 10.790 | Variable | | | 4.9631 |
| 21 | 17.656 | 4.00 | 1.72916 | 54.68 | 5.4951 |
| 22 | −19.207 | 6.51 | | | 5.3212 |
| 23 | −16.688 | 0.70 | 1.80518 | 25.42 | 2.6391 |
| 24 | −158.795 | Variable | | | 2.5319 |
| 25 | ∞ | 1.00 | 1.52113 | 66.54 | |
| 26 | ∞ | 0.50 | | | |
| 27 | ∞ | 0.70 | 1.51633 | 64.14 | |
| 28 | ∞ | 0.50 | | | |
| Image plane | ∞ | | | | |

-continued

Unit mm

Zoom data
Zoom ratio 1.97

|   | WE1 | ST1 | TE1 | WE2 | ST2 | TE2 |
|---|---|---|---|---|---|---|
| f | 15.00 | 20.25 | 29.58 | 14.84 | 19.80 | 27.89 |
| FNO. | 2.62 | 3.54 | 5.17 | 2.60 | 3.46 | 4.88 |
| FB | 3.20 | 3.20 | 3.20 | 3.20 | 3.20 | 3.20 |
| LTL | 61.85 | 61.85 | 61.85 | 61.85 | 61.85 | 61.85 |
| d5 | 0.50 | 7.61 | 16.28 | 0.50 | 7.61 | 16.28 |
| d8 | 17.52 | 10.41 | 1.74 | 17.52 | 10.41 | 1.74 |
| d16 | 2.60 | 3.25 | 3.91 | 2.86 | 3.73 | 5.01 |
| d20 | 4.98 | 4.33 | 3.67 | 4.72 | 3.85 | 2.57 |
| d24 | 0.50 | 0.50 | 0.50 | 0.50 | 0.50 | 0.50 |
| IH | 1.92 | 2.73 | 3.00 | 1.92 | 2.73 | 3.00 |
| ω | 7.43 | 7.81 | 5.72 | 7.55 | 7.99 | 5.82 |

Unit focal length f1 = 57.89  f2 = −21.98  f3 = 14.12  f4 = −12.37  f5 = 17.24

Example 6

Unit mm

Surface data

| Surface no. | r | d | nd | vd | ER |
|---|---|---|---|---|---|
| Object plane | ∞ | ∞ | | | |
| 1 | 68.855 | 1.05 | 1.57135 | 52.95 | 3.895 |
| 2 | 15.829 | 1.91 | | | 3.759 |
| 3 | 18.450 | 3.84 | 1.80400 | 46.57 | 3.7329 |
| 4 | −29.377 | 0.70 | 1.69895 | 30.13 | 3.4079 |
| 5 | 98.570 | Variable | | | |
| 6 | −42.649 | 0.70 | 1.88300 | 40.76 | 3.3369 |
| 7 | 14.728 | 1.67 | 1.84666 | 23.78 | 3.4329 |
| 8 | 57.254 | Variable | | | 3.548 |
| 9 | 88.682 | 2.53 | 1.88300 | 40.76 | 9.3055 |
| 10 | −48.966 | 0.30 | | | 9.3736 |
| 11 | 33.990 | 4.00 | 1.51633 | 64.14 | 9.224 |
| 12 | −27.094 | 0.70 | 1.80518 | 25.42 | 9.0672 |
| 13 | −81.961 | 0.30 | | | 8.9749 |
| 14 | 13.885 | 0.74 | 1.78472 | 25.68 | 8.3044 |
| 15 | 10.591 | 4.08 | 1.49700 | 81.61 | 7.7434 |
| 16 | 67.637 | Variable | | | 7.394 |
| 17 | −107.673 | 0.70 | 1.67003 | 47.23 | 6.1122 |
| 18 | 10.162 | Variable | | | 5.5699 |
| 19 | 15.470 | 3.62 | 1.49700 | 81.61 | 5.9803 |
| 20 | −19.677 | 1.62 | | | 5.8377 |
| 21 | 30.113 | 4.00 | 1.80610 | 40.92 | 4.9025 |
| 22 | −6.601 | 0.70 | 1.77250 | 49.60 | 4.4299 |
| 23 | −44.340 | 0.69 | | | 3.7974 |
| 24 | −13.842 | 1.00 | 1.72151 | 29.23 | 3.5295 |
| 25 | −26.023 | 0.34 | | | 3.287 |
| 26 | 42.532 | 1.00 | 1.88300 | 40.76 | 2.9757 |
| 27 | 11.022 | Variable | | | 2.6451 |
| 28 | ∞ | 1.00 | 1.52113 | 66.54 | |
| 29 | ∞ | 0.50 | | | |
| 30 | ∞ | 0.70 | 1.51633 | 64.14 | |
| 31 | ∞ | 0.50 | | | |
| Image plane | ∞ | | | | |

Zoom data
Zoom ratio 2.50

|   | WE1 | ST1 | TE1 | WE2 | ST2 | TE2 |
|---|---|---|---|---|---|---|
| f | 15.79 | 23.69 | 39.48 | 15.59 | 22.92 | 35.20 |
| FNO. | 2.40 | 3.60 | 5.99 | 2.37 | 3.48 | 5.35 |
| FB | 3.47 | 3.47 | 3.47 | 3.47 | 3.47 | 3.47 |
| LTL | 77.00 | 77.00 | 77.00 | 77.00 | 77.00 | 77.00 |
| d5 | 0.67 | 12.17 | 26.50 | 0.67 | 12.17 | 26.50 |
| d8 | 26.64 | 15.13 | 0.80 | 26.64 | 15.13 | 0.80 |
| d16 | 3.60 | 4.30 | 4.41 | 3.90 | 4.98 | 6.49 |
| d18 | 6.42 | 5.72 | 5.61 | 6.12 | 5.04 | 3.52 |
| d27 | 0.77 | 0.77 | 0.77 | 0.77 | 0.77 | 0.77 |
| IH | 1.92 | 2.73 | 3.00 | 1.92 | 2.73 | 3.00 |
| ω | 7.08 | 6.73 | 4.26 | 7.29 | 7.05 | 4.43 |

Unit focal length f1 = 68.65  f2 = −26.01  f3 = 15.88  f4 = −13.76  f5 = 19.45

Example 7

Unit mm

Surface data

| Surface no. | r | d | nd | vd | ER |
|---|---|---|---|---|---|
| Object plane | ∞ | ∞ | | | |
| 1 | −11.701 | 2.79 | 1.88300 | 40.76 | 2.0965 |
| 2 | −15.802 | 0.30 | | | 2.156 |
| 3 | 42.274 | 1.71 | 1.49700 | 81.61 | 2.1142 |
| 4 | −9.698 | 0.70 | 1.88300 | 40.76 | 2.01 |
| 5 | −13.684 | Variable | | | |
| 6 | −13.944 | 1.48 | 1.92286 | 18.90 | 2.0974 |
| 7 | −6.064 | 0.70 | 1.80100 | 34.97 | 2.2253 |
| 8 | 27.196 | Variable | | | 2.3294 |
| 9 | 34.781 | 2.30 | 1.78800 | 47.37 | 5.6313 |
| 10 | −24.168 | 3.65 | | | 5.6898 |
| 11 | 14.811 | 3.00 | 1.72916 | 54.68 | 5.1501 |
| 12 | −15.411 | 1.20 | 1.92286 | 18.90 | 4.8761 |
| 13 | 229.642 | Variable | | | 4.5686 |
| 14 | −19.258 | 0.70 | 1.49700 | 81.61 | 4.1099 |
| 15 | 9.619 | Variable | | | 3.9054 |
| 16 | 82.597 | 3.00 | 1.69680 | 55.53 | 4.2179 |
| 17 | −6.836 | 0.70 | 1.56883 | 56.36 | 4.2416 |
| 18 | −33.232 | Variable | | | 4.1506 |
| 19 | ∞ | 1.00 | 1.52113 | 66.54 | |
| 20 | ∞ | 0.50 | | | |
| 21 | ∞ | 14.20 | 1.51633 | 64.14 | |
| 22 | ∞ | 1.00 | | | |
| Image plane | ∞ | | | | |

Zoom data
Zoom ratio 2.45

|   | WE1 | ST1 | TE1 | WE2 | ST2 | TE2 |
|---|---|---|---|---|---|---|
| f | 15.50 | 24.33 | 37.98 | 15.42 | 23.92 | 35.91 |
| FNO. | 4.41 | 6.93 | 10.81 | 4.39 | 6.81 | 10.22 |
| FB | 20.00 | 20.00 | 20.00 | 20.00 | 20.00 | 20.00 |
| LTL | 65.53 | 65.53 | 65.53 | 65.53 | 65.53 | 65.53 |
| d5 | 1.60 | 8.00 | 13.99 | 1.60 | 8.00 | 13.99 |
| d8 | 14.00 | 7.59 | 1.61 | 14.00 | 7.59 | 1.61 |
| d13 | 2.13 | 3.46 | 4.40 | 2.29 | 3.88 | 5.52 |
| d15 | 5.57 | 4.24 | 3.30 | 5.41 | 3.82 | 2.18 |
| d18 | 3.30 | 3.30 | 3.30 | 3.30 | 3.30 | 3.30 |
| IH | 1.92 | 2.73 | 3.00 | 1.92 | 2.73 | 3.00 |
| ω | 7.19 | 6.46 | 4.43 | 7.27 | 6.58 | 4.47 |

Unit focal length f1 = 35.13  f2 = −13.07  f3 = 12.13  f4 = −12.77  f5 = 22.87

Example 8

Unit mm

Surface data

| Surface no. | r | d | nd | vd | ER |
|---|---|---|---|---|---|
| Object plane | ∞ | ∞ | | | |
| 1 | 50.358 | 1.83 | 1.57135 | 52.95 | 3.8019 |
| 2 | 14.675 | 1.94 | | | 3.5814 |
| 3 | 16.999 | 1.78 | 1.80400 | 46.57 | 3.5442 |
| 4 | −29.018 | 0.70 | 1.69895 | 30.13 | 3.4172 |
| 5 | 70.056 | Variable | | | |
| 6 | −39.988 | 0.70 | 1.88300 | 40.76 | 3.3325 |
| 7 | 14.043 | 1.76 | 1.84666 | 23.78 | 3.4295 |
| 8 | 62.753 | Variable | | | 3.5483 |
| 9 | 79.109 | 2.42 | 1.88300 | 40.76 | 7.6446 |
| 10 | −38.911 | 0.30 | | | 7.7223 |
| 11 | 28.814 | 4.00 | 1.69680 | 55.53 | 7.5858 |
| 12 | −21.528 | 0.70 | 2.00330 | 28.27 | 7.3319 |
| 13 | −390.775 | 0.30 | | | 7.2042 |
| 14 | 16.073 | 0.80 | 1.72825 | 28.46 | 6.9075 |
| 15 | 10.936 | 3.78 | 1.48749 | 70.23 | 6.5115 |
| 16 | −173.628 | Variable | | | 6.1797 |
| 17 | −50.070 | 0.70 | 1.54814 | 45.79 | 5.1843 |
| 18 | 10.428 | Variable | | | 4.7986 |
| 19 | 1839.511 | 3.03 | 1.49700 | 81.61 | 4.7871 |
| 20 | −14.622 | 0.30 | | | 4.7816 |
| 21 | 14.953 | 3.57 | 1.80100 | 34.97 | 4.4519 |
| 22 | −8.710 | 0.70 | 1.74400 | 44.78 | 3.9885 |
| 23 | −31.819 | 0.56 | | | 3.5903 |
| 24 | −21.100 | 1.00 | 2.00330 | 28.27 | 3.2453 |
| 25 | −20.588 | 0.31 | | | 3.0496 |
| 26 | −18.715 | 1.00 | 1.84666 | 23.78 | 2.8381 |
| 27 | 12.652 | Variable | | | 2.5147 |
| 28 | ∞ | 1.00 | 1.52113 | 66.54 | |
| 29 | ∞ | 0.50 | | | |
| 30 | ∞ | 0.70 | 1.51633 | 64.14 | |
| 31 | ∞ | 0.50 | | | |
| Image plane | ∞ | | | | |

Zoom data
Zoom ratio 1.97

| | WE1 | ST1 | TE1 | WE2 | ST2 | TE2 |
|---|---|---|---|---|---|---|
| f | 15.79 | 21.34 | 31.14 | 15.50 | 20.58 | 28.60 |
| FNO. | 2.42 | 3.26 | 4.76 | 2.37 | 3.15 | 4.38 |
| FB | 3.39 | 3.39 | 3.39 | 3.39 | 3.39 | 3.39 |
| LTL | 64.75 | 64.75 | 64.75 | 64.75 | 64.75 | 64.75 |
| d5 | 0.68 | 9.03 | 19.44 | 0.68 | 9.03 | 19.44 |
| d8 | 19.56 | 11.21 | 0.80 | 19.56 | 11.21 | 0.80 |
| d16 | 2.95 | 3.41 | 3.53 | 3.30 | 4.06 | 5.02 |
| d18 | 5.98 | 5.52 | 5.40 | 5.64 | 4.87 | 3.91 |
| d27 | 0.69 | 0.69 | 0.69 | 0.69 | 0.69 | 0.69 |
| IH | 1.92 | 2.73 | 3.00 | 1.92 | 2.73 | 3.00 |
| ω | 7.01 | 7.33 | 5.37 | 7.18 | 7.60 | 5.58 |

Unit focal length f1 = 63.55  f2 = −25.88  f3 = 14.54  f4 = −15.60  f5 = 24.66

Example 9

Unit mm

Surface data

| Surface no. | r | d | nd | vd | ER |
|---|---|---|---|---|---|
| Object plane | ∞ | ∞ | | | |
| 1 | 97.896 | 1.37 | 1.69895 | 30.13 | 3.1746 |
| 2 | 15.202 | 2.03 | | | 3.0305 |
| 3 | 16.965 | 1.72 | 1.69680 | 55.53 | 3.0133 |
| 4 | 52.126 | 1.32 | 1.88300 | 40.76 | 2.8922 |
| 5 | −115.435 | Variable | | | |
| 6 | −32.291 | 0.70 | 1.71999 | 50.23 | 2.8547 |
| 7 | 10.846 | 1.59 | 1.80518 | 25.42 | 2.9563 |
| 8 | 27.963 | Variable | | | 3.042 |
| 9 | 50.985 | 3.00 | 1.88300 | 40.76 | 6.6735 |
| 10 | −52.856 | 0.30 | | | 6.7707 |
| 11 | 17.820 | 4.00 | 1.69680 | 55.53 | 6.7128 |
| 12 | −22.230 | 0.70 | 1.80518 | 25.42 | 6.3974 |
| 13 | 129.859 | 0.50 | | | 6.1327 |
| 14 | 9.526 | 1.05 | 2.00330 | 28.27 | 5.6208 |
| 15 | 6.583 | 2.37 | 1.49700 | 81.61 | 4.946 |
| 16 | 9.602 | Variable | | | 4.5772 |
| 17 | −65.368 | 0.70 | 1.88300 | 40.76 | 4.3026 |
| 18 | 38.537 | Variable | | | 4.2419 |
| 19 | 15.191 | 3.89 | 1.88300 | 40.76 | 4.1943 |
| 20 | −8.424 | 0.71 | 1.69895 | 30.13 | 3.8693 |
| 21 | −120.958 | 1.78 | | | 3.518 |
| 22 | −10.009 | 0.70 | 1.60300 | 65.44 | 2.9368 |
| 23 | −39.319 | Variable | | | 2.8197 |
| 24 | ∞ | 1.00 | 1.52113 | 66.54 | |
| 25 | ∞ | 0.50 | | | |
| 26 | ∞ | 0.70 | 1.51633 | 64.14 | |
| 27 | ∞ | 0.50 | | | |
| Image plane | ∞ | | | | |

Zoom data
Zoom ratio 1.97

| | WE1 | ST1 | TE1 | WE2 | ST2 | TE2 |
|---|---|---|---|---|---|---|
| f | 14.82 | 20.01 | 29.23 | 14.73 | 19.76 | 28.07 |
| FNO. | 2.82 | 3.80 | 5.56 | 2.80 | 3.76 | 5.34 |
| FB | 4.4 | 4.4 | 4.4 | 4.4 | 4.4 | 4.4 |
| LTL | 58.97 | 58.97 | 58.97 | 58.97 | 58.97 | 58.97 |
| d5 | 0.80 | 6.52 | 13.32 | 0.80 | 6.52 | 13.32 |
| d8 | 16.97 | 10.07 | 1.70 | 16.97 | 10.07 | 1.70 |
| d16 | 2.94 | 4.12 | 5.69 | 3.65 | 5.44 | 8.72 |
| d18 | 5.43 | 5.43 | 5.43 | 4.72 | 4.11 | 2.40 |
| d23 | 1.70 | 1.70 | 1.70 | 1.70 | 1.70 | 1.70 |
| IH | 1.92 | 2.73 | 3.00 | 1.92 | 2.73 | 3.00 |
| ω | 7.48 | 7.84 | 5.81 | 7.59 | 7.98 | 5.90 |

Unit focal length f1 = 57.42  f2 = −22.84  f3 = 16.10  f4 = −27.21  f5 = 19.70

Next, the values of conditional expressions (2) to (13) in each example are shown below.

| Conditional expression | Example 1 | Example 2 | Example 3 |
|---|---|---|---|
| (2) $f_4/f_5$ | −0.71 | −0.81 | −0.75 |
| (3) $|\beta_{ctw}|$ | 1.79 | 1.33 | 1.34 |
| (4) $d_{ng}/d_{pg}$ | 0.34 | 0.19 | 0.20 |
| (5) $\varphi_{fc}/\varphi_{L1}$ | 1.76 | 1.66 | 1.37 |
| (6) $f_4/f_{Lw}$ | −1.00 | −0.90 | −0.91 |
| (7) $f_5/f_{Lw}$ | 1.40 | 1.11 | 1.21 |
| (8) $f_{ng}/f_{pg}$ | −1.19 | −1.45 | −1.74 |
| (9) $|\beta_{ctt}|/|\beta_{ctw}|$ | 0.98 | 0.97 | 0.98 |
| (10) $\varphi_{L1}/f_{Lt}$ | 0.07 | 0.11 | 0.12 |
| (11) $(r_{4Gff} + r_{4Gfb})/(r_{4Gff} − r_{4Gfb})$ | 0.29 | 0.68 | 0.92 |
| (12) $(r_{lf} + r_{lb})/(r_{lf} − r_{lb})$ | −1.15 | −0.51 | 0.09 |
| (13) $|(y_{w7d'} − y_{w7d})/P|/(1/N)$ | 75.02 | 105.18 | 152.38 |

| Conditional expression | Example 4 | Example 5 | Example 6 |
|---|---|---|---|
| (2) $f_4/f_5$ | −0.67 | −0.72 | −0.71 |
| (3) $|\beta_{ctw}|$ | 1.18 | 1.68 | 1.58 |
| (4) $d_{ng}/d_{pg}$ | 0.24 | 0.21 | 0.19 |
| (5) $\varphi_{fc}/\varphi_{L1}$ | 1.54 | 1.71 | 1.57 |
| (6) $f_4/f_{Lw}$ | −1.12 | −0.82 | −0.87 |
| (7) $f_5/f_{Lw}$ | 1.68 | 1.15 | 1.23 |
| (8) $f_{ng}/f_{pg}$ | −1.68 | −1.56 | −1.64 |

-continued

| | | | |
|---|---|---|---|
| (9) $|\beta_{ctt}|/|\beta_{ctw}|$ | 0.94 | 0.96 | 0.97 |
| (10) $\varphi_{L1}/f_{Lt}$ | 0.12 | 0.11 | 0.10 |
| (11) $(r_{4Gff} + r_{4Gfb})/(r_{4Gff} - r_{4Gfb})$ | 1.72 | 0.45 | 0.83 |
| (12) $(r_{lf} + r_{lb})/(r_{lf} - r_{lb})$ | 0.50 | −1.23 | 1.70 |
| (13) $|(y_{w7d'} - y_{w7d})/P|/(1/N)$ | 144.29 | 109.78 | 186.46 |

| Conditional expression | Example 7 | Example 8 | Example 9 |
|---|---|---|---|
| (2) $f_4/f_5$ | −0.56 | −0.63 | −1.38 |
| (3) $|\beta_{ctw}|$ | 2.86 | 1.38 | 0.60 |
| (4) $d_{ng}/d_{pg}$ | 0.22 | 0.20 | 0.19 |
| (5) $\varphi_{fc}/\varphi_{L1}$ | 1.96 | 1.36 | 1.36 |
| (6) $f_4/f_{Lw}$ | −0.82 | −0.99 | −1.84 |
| (7) $f_5/f_{Lw}$ | 1.48 | 1.56 | 1.33 |
| (8) $f_{ng}/f_{pg}$ | −1.08 | −1.78 | −1.42 |
| (9) $|\beta_{ctt}|/|\beta_{ctw}|$ | 0.93 | 0.97 | 1.00 |
| (10) $\varphi_{L1}/f_{Lt}$ | 0.06 | 0.12 | 0.11 |
| (11) $(r_{4Gff} + r_{4Gfb})/(r_{4Gff} - r_{4Gfb})$ | 0.33 | 0.66 | 0.26 |
| (12) $(r_{lf} + r_{lb})/(r_{lf} - r_{lb})$ | −1.52 | 0.19 | −1.68 |
| (13) $|(y_{w7d'} - y_{w7d})/P|/(1/N)$ | 86.76 | 162.91 | 121.79 |

Figure 20:
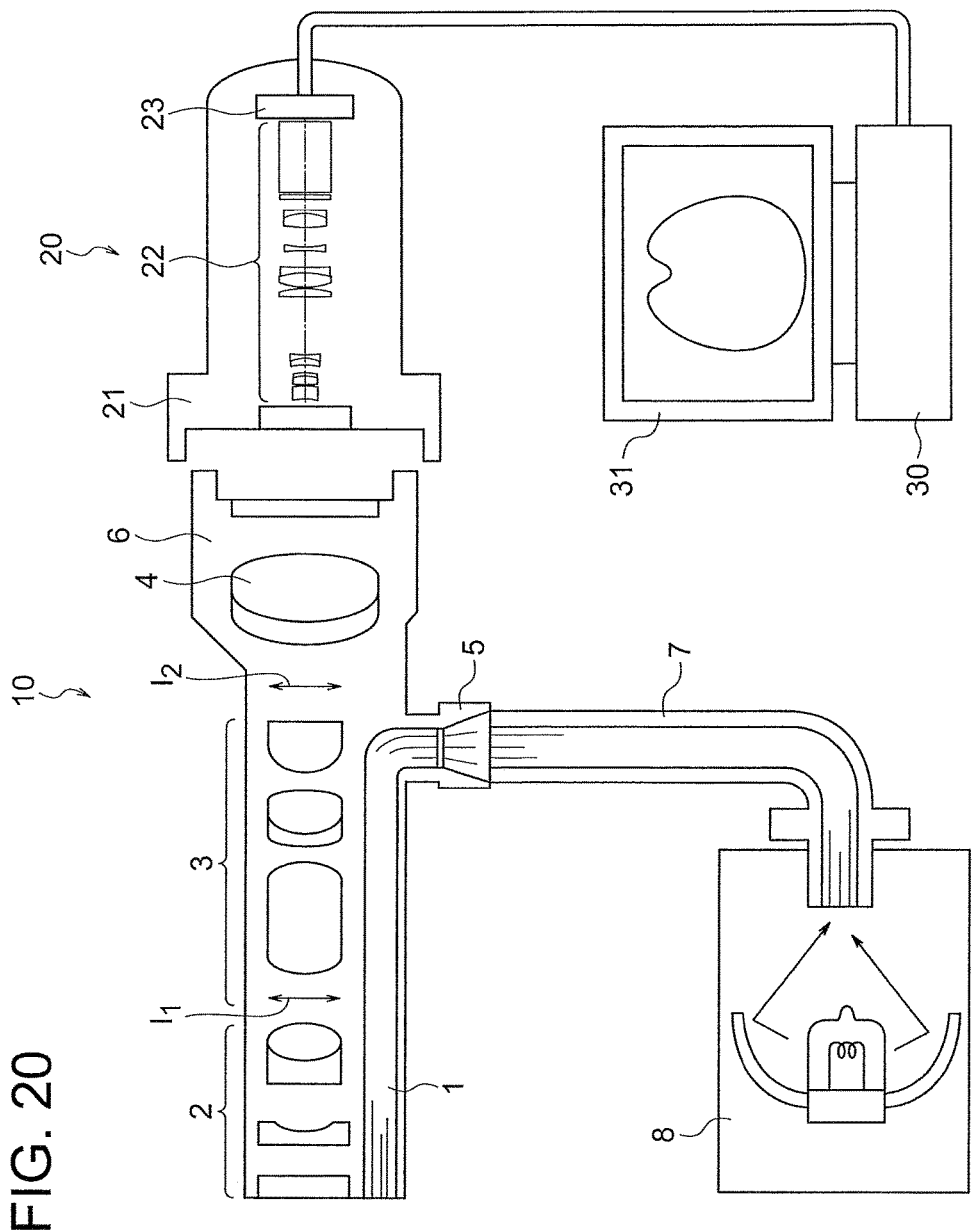
FIG. 20 is a diagram showing how a zoom image pickup apparatus of the present embodiment is connected to an optical instrument.

As to how the zoom image pickup apparatus of the present embodiment is connected to an optical instrument is shown in FIG. 20. FIG. 20 shows a case in which an optical instrument is a rigid endoscope.

A rigid endoscope 10 includes a scope-side light guide 1, an objective lens 2, a relay lens 3, an eyepiece 4, and an optical element 5. The eyepiece 4 is disposed in an eyepiece portion 6 of the rigid endoscope 10. Moreover, a light-source apparatus 8 is connected to the rigid endoscope 10 via a light guiding cable 7.

Light emerged from the light-source apparatus 8 is transmitted up to an incidence portion of the scope-side light guide 1 by the light guiding cable 7. Here, the light guiding cable 7 and the scope-side light guide 1 are either connected directly or connected via the optical element 5. The optical element 5 is an element which converts an NA of light emerged from the light guiding cable 7.

Illumination light incident on the scope-side light guide 1 is transmitted to a front end of the rigid endoscope 10. The Illumination light is radiated to an object from the front end of the rigid endoscope 10.

An object image $I_1$ is formed by the objective lens 2. The object image $I_1$ is relayed by the relay lens 3, and an object image $I_2$ is formed at a predetermined position. A user is capable of observing visually the object through the eyepiece portion 6.

In a case of acquiring an image of an object, a zoom image pickup apparatus 20 of the present embodiment is to be connected to the eyepiece portion 6. The zoom image pickup apparatus 20 includes a mount portion 21, a zoom lens 22, and an image pickup element 23. In FIG. 20, the zoom lens according to the example 1 is used for the zoom lens 22. Since the zoom lens according to the example 1 is an optical system suitable for a type in which image pickup is carried out by using three image pickup elements (three-plate type), a prism is disposed prior to the image pickup element 23. By using the zoom lens of another example, it is possible to use a type in which image pickup is carried out by using one image pickup element (single-plate type).

As the mount portion 21, amount such as amount of screw type and a mount of bayonet type is to be used. Even for the eyepiece portion 6, by using a mount such as the mount of screw type and the mount of bayonate type, it is possible to connect the rigid endoscope 10 and the image pickup apparatus 20.

By the rigid endoscope 10 and the zoom image pickup apparatus 20 being connected, light from an object is incident from the eyepiece lens 4 to the zoom lens 22 via the mount portion 21. The light incident on the zoom lens 22 is formed as an image by the zoom lens 22, and an image of the object is formed at an image forming position. The image pickup element 23 being disposed at the image forming position, the object image is picked up by the image pickup element 23. In such manner, it is possible to acquire an image of the object.

The image of the object is sent to a processing unit 30. In the processing unit 30, various processing is carried out according to the requirement. The image of the object is eventually displayed on a television monitor 31.

In the display of the image of the object, as shown in FIG. 20, an arrangement may be made such that a side corresponding to an upper portion of the unit, of a peripheral portion of an image observed becomes a caved-in image. For this, a projection may be provided to a part of an aperture of a field stop of the rigid endoscope. When such an arrangement is made, a relationship of an image achieved by light rays passing through the eyepiece portion and the upper portion of the unit becomes easily understandable.

By devising a method for disposing a fiber bundle in a case of a flexible endoscope, it is possible to achieve similar effect. Moreover, in a telescope and a microscope, it is preferable to use a field stop having a similar shape. By disposing the bundle, an arrangement may be made such that a side corresponding to an upper portion of the unit, of a peripheral portion of an image observed becomes caved-in image. A relationship of an image achieved by light rays passing through the eyepiece portion and the upper portion of the unit becomes easily understandable.

The size of the object image $I_2$ is determined by the objective lens 2 and the relay lens 3. Therefore, in the zoom image pickup apparatus 20, an image of a predetermined size is formed on the image pickup element 23 by the zoom lens 22. Consequently, the size of the image formed on the image pickup element 23 varies according to the magnification of the zoom lens.

A size of a light receiving surface of the image pickup element being constant, in a telescope, an image larger than the light receiving surface is formed on the light receiving surface of the image pickup element 23. In this case, since a part of the object image I2 is captured, an image in which a part of an object has been enlarged is acquired.

At the wide angle end, on the light receiving surface of the image pickup element 23, the object image $I_2$ is formed to be accommodated in a longitudinal width of the light receiving surface. At this time, in a short-side direction, a peripheral portion of the object image $I_2$ runs off the light receiving surface. Consequently, an image displayed on the television monitor 31 has four corners cut, such as an image having a portrait-oriented oval shape as an outer shape.

In this example, the zoom lens according to the present embodiment has been used for the zoom lens 22. Therefore, an image of a size desired by the user is achieved. In this case, it is possible to achieve an image in which aberrations are corrected favorably. Furthermore, the variation in the image height being small at the time of focusing, it is possible to achieve an image with no uncomfortable feeling all the time.

According to the present invention, it is possible to provide a zoom image pickup apparatus in which an occurrence of axial aberration is suppressed adequately, and the fluctuation in the spherical aberration at the time of focusing is small.

As described above, the present invention is suitable for a zoom pickup apparatus in which an occurrence of axial aberration is suppressed adequately, and the fluctuation in the spherical aberration at the time of focusing is small.

What is claimed is:
1. A zoom image pickup apparatus, comprising:
a mount portion;
a zoom lens which forms an image of light incident from the mount portion; and
an image pickup element which is disposed at an image forming position, wherein
the zoom lens includes in order from an object side,
a first lens unit having a positive refractive power,
a second lens unit having a negative refractive power,
a third lens unit having a positive refractive power,
a fourth lens unit having a negative refractive power, and
a fifth lens unit having a positive refractive power, and
the fourth lens unit is a focusing lens unit, and
at the time of zooming from a wide angle end to a telephoto end, at least the second lens unit and the fourth lens unit move, and
at the wide angle end when focused to a first object, the following conditional expression (1) is satisfied:

$$\phi_{L1} < \phi_{3GL1} \quad (1)$$

where,
$\phi_{L1}$ denotes an effective diameter of a lens surface positioned nearest to object of the zoom lens,
$\phi_{3GL1}$ denotes an effective diameter of a lens surface positioned nearest to object of the third lens unit,
the first object is an object when an object-point distance is 1000 mm, here
the object-point distance is a distance from a lens surface positioned nearest to object of the zoom lens, up to the object, and
the effective diameter is the maximum diameter of a range on a target lens surface, through which a light ray contributing to image formation passes.

2. The zoom image pickup apparatus according to claim 1, wherein the following conditional expression (2) is satisfied:

$$-4.5 < f_4/f_5 < -0.2 \quad (2)$$

where,
$f_4$ denotes a focal length of the fourth lens unit, and
$f_5$ denotes a focal length of the fifth lens unit.

3. The zoom image pickup apparatus according to claim 1, wherein the following conditional expression (3) is satisfied:

$$0.55 < |\beta_{ctw}| < 5 \quad (3)$$

where,
$\beta_{ctw} = (1 - \beta_{fcw} \times \beta_{fcw}) \times \beta_w' \times \beta_w'$, here
each of $\beta_{fcw}$ and $\beta_w'$ is a lateral magnification at the wide angle end when focused to the first object, and $\beta_{fcw}$ denotes a lateral magnification of the fourth lens unit and $\beta_w'$ denotes a lateral magnification of a lens unit positioned on an image side of the fourth lens unit,
the first object is an object when the object-point distance is 1000 mm, and
the object-point distance is a distance from a lens surface positioned nearest to object of the zoom lens up to an object.

4. The zoom image pickup apparatus according to claim 1, wherein the following conditional expression (4) is satisfied:

$$0.1 < d_{ng}/d_{pg} < 0.9 \quad (4)$$

where,
each of $d_{ng}$ and $d_{pg}$ is a thickness on an optical axis of a lens unit, and
$d_{ng}$ denotes a thickness of the second lens unit having a negative refractive power, and
$d_{pg}$ denotes a thickness of the third lens unit having a positive refractive power.

5. The zoom image pickup apparatus according to claim 1, wherein the following conditional expression (5) is satisfied:

$$1 < \phi_{fc}/\phi_{L1} < 3 \quad (5)$$

where,
each of $\phi_{fc}$ and $\phi_{L1}$ is an effective diameter at the wide angle end when focused to the first object, and
$\phi_{fc}$ denotes an effective diameter of a lens surface positioned nearest to object of the focusing lens unit,
$\phi_{L1}$ denotes the effective diameter of a lens surface positioned nearest to object of the zoom lens,
the first object is an object when an object-point distance is 1000 mm, where
the object-point distance is the distance from the lens surface positioned nearest to object of the zoom lens, up to the object, and
the effective diameter is the maximum diameter of a range on a target lens surface, through which a light ray contributing to image formation passes.

6. The zoom image pickup apparatus according to claim 1, wherein the following conditional expression (6) is satisfied:

$$-4 < f_4/f_{Lw} < -0.4 \quad (6)$$

where,
$f_4$ denotes a focal length of the fourth lens unit,
$f_{Lw}$ denotes a focal length at the wide angle end of the zoom lens when focused to the first object,
the first object is an object when an object-point distance is 1000 mm, and
the object-point distance is a distance from a lens surface positioned nearest to object of the zoom lens up to the object.

7. The zoom image pickup apparatus according to claim 1, wherein the following conditional expression (7) is satisfied $$1 < f_5/f_{Lw} < 3 \quad (7)$$

where,
$f_5$ denotes a focal length of the fifth lens unit,
$f_{Lw}$ denotes a focal length at a wide angle end of the zoom lens when focused to the first object, and
the first object is an object when an object-point distance is 1000 mm, here
the object-point distance is a distance from a lens surface positioned nearest to object of the zoom lens, up to the object.

8. The zoom image pickup apparatus according to claim 1, wherein the following conditional expression (8) is satisfied:

$$-5 < f_{ng}/f_{pg} < -0.5 \quad (8)$$

where,
$f_{ng}$ denotes a focal length of a lens having the largest negative refractive power from among focal lengths of lens units positioned on the object side of the fourth lens unit, and
$f_{pg}$ denotes a focal length of a lens having the largest positive refractive power from among focal lengths of lens units positioned on the object side of the fourth lens unit.

9. The zoom image pickup apparatus according to claim 1, wherein
only the fourth lens unit moves at the time of focusing, and
the following conditional expression (9) is satisfied $$0.8<|\beta_{ctt}|/|\beta_{ctw}|<1.8 \tag{9}$$

where,
$\beta_{ctt}=(1-\beta_{fct}\times\beta_{fct})\times\beta_t'\times\beta_t'$
$\beta_{ctw}=(1-\beta_{fcw}\times\beta_{fcw})\times\beta_w'\times\beta_w'$, here
each of $\beta_{fct}$ and $\beta_t'$ is a lateral magnification at the telephoto end when focused to the first object, and $\alpha_{fct}$ denotes a lateral magnification of the fourth lens unit and $\beta_t'$ denotes a lateral magnification of a lens unit positioned on an image side of the fourth lens unit,
each of $\beta_{fcw}$ and $\beta_w'$ is a lateral magnification at the wide angle end when focused to the first object, and $\beta_{fcw}$ denotes a lateral magnification of the fourth lens unit and $\beta_w'$ denotes a lateral magnification of a lens unit positioned on an image side of the fourth lens unit, and
the first object is an object when the object-point distance is 1000 mm, and
the object-point distance is a distance from a lens surface positioned nearest to object of the zoom lens up to an object.

10. The zoom image pickup apparatus according to claim 1, wherein the following conditional expression (10) is satisfied:

$$0.03<\phi_{L1}/f_{Lt}<0.2 \tag{10}$$

where,
$\phi_{L1}$ is the effective diameter of a lens surface positioned nearest to object of the zoom lens, and denotes an effective diameter at the wide angle end when focused to the first object,
$f_{Lt}$ denotes a focal length at the telephoto end of the zoom lens when focused to the first object,
the first object is an object when an object-point distance is 1000 mm, where
the object-point distance is the distance from the lens surface positioned nearest to object of the zoom lens, up to the object, and
the effective diameter is the maximum diameter of a range on a target lens surface, through which a light ray contributing to image formation passes.

11. The zoom image pickup apparatus according to claim 1, wherein
at the time of zooming from the wide angle end to the telephoto end, only the second lens unit and the fourth lens unit move, and the first lens unit, the third lens unit, and the fifth lens unit are fixed.

12. The zoom image pickup apparatus according to claim 1, wherein the third lens unit includes a positive lens which is disposed nearest to object and a cemented lens which is disposed nearest to image.

13. The zoom image pickup apparatus according to claim 1, wherein
a rearmost lens is disposed nearest to image, and
the rearmost lens includes a positive lens which is disposed nearest to object and a negative lens which is disposed nearest to image.

14. The zoom image pickup apparatus according to claim 1, wherein the following conditional expression (11) is satisfied:

$$-5<(r_{4Gff}+r_{4Gfb})/(r_{4Gff}-r_{4Gfb})<5 \tag{11}$$

where,
$r_{4Gff}$ denotes a radius of curvature of an object-side lens surface of a lens positioned nearest to object in the fourth lens unit, and
$r_{4Gfb}$ denotes a radius of curvature of an image-side lens surface of a lens positioned nearest to image in the fourth lens unit.

15. The zoom image pickup apparatus according to claim 1, wherein the following conditional expression (12) is satisfied:

$$-5<(r_{1f}+r_{1b})/(r_{1f}-r_{1b})<5 \tag{12}$$

where,
$r_{1f}$ denotes a radius of curvature of an object-side lens surface of a lens positioned nearest to image, and
$r_{1b}$ denotes a radius of curvature of an image-side lens surface of the lens positioned nearest to image.

16. A zoom image pickup apparatus, comprising:
a mount portion;
a zoom lens which forms an image of light incident from the mount portion; and
an image pickup element which is disposed at an image forming position, wherein
the zoom lens includes in order from an object side,
a first lens unit having a positive refractive power,
a second lens unit having a negative refractive power,
a third lens unit having a positive refractive power,
a fourth lens unit having a negative refractive power, and
a fifth lens unit having a positive refractive power, and
the fourth lens unit is a focusing lens unit, and
at the time of zooming from a wide angle end to a telephoto end, only the second lens unit and the fourth lens unit move, and the first lens unit, the third lens unit, and the fifth lens unit are fixed, and
the following conditional expression (13) is satisfied:

$$|(y_{w7d}-y_{w7d'})/P|/(1/N)<250 \tag{13}$$

where,
a side of the mount portion is let to be an object side and a side of the image pickup element is let to be an image side,
each of $y_{w7d}$ and $y_{w7d'}$ is a height of a predetermined light ray at a position at which the predetermined light ray intersects an image plane, and $y_{w7d}$ denotes a light-ray height when focused to the first object and $y_{w7d'}$ denotes a light-ray height in a defocused state, here
the defocused state is a state in which the focusing lens unit is moved by $\Delta_{s2}$ when focused to the first object, and $\Delta_{s2}=10\times P$, $0.0008<P<0.005, 0.05<1/N<1$, where,
N denotes the number of pixels (unit millions of pixels) of the image pickup element,
P denotes a pixel pitch (unit mm) of the image pickup element,
the predetermined light ray is a light ray with an angle of view of 7 degrees at the wide angle end, which passes through a center of a lens surface nearest to object of the zoom lens,
the first object is an object when an object-point distance is 1000 mm, and
the object-point distance is a distance from a lens surface positioned nearest to object of the zoom lens, up to the object.

* * * * *